(12) United States Patent
Bisang et al.

(10) Patent No.: US 10,898,748 B2
(45) Date of Patent: Jan. 26, 2021

(54) FASTENING DEVICE FOR A TRAMPOLINE

(71) Applicant: Angehrn AG Umformtechnik, Degersheim (CH)

(72) Inventors: Erwin Bisang, Huenenberg (CH); Ludwig Durrer-Kuettel, Immensee (CH); Christian Mehr, Kirchberg (CH); Silvan Schwarz, Lichtensteig (CH)

(73) Assignee: Angehrn AG Umformtechnik, Degersheim (CH)

( * ) Notice: Subject to any disclaimer, the term of this patent is extended or adjusted under 35 U.S.C. 154(b) by 38 days.

(21) Appl. No.: 16/098,327

(22) PCT Filed: May 2, 2017

(86) PCT No.: PCT/EP2017/060388
§ 371 (c)(1),
(2) Date: Nov. 1, 2018

(87) PCT Pub. No.: WO2017/191119
PCT Pub. Date: Nov. 9, 2017

(65) Prior Publication Data
US 2019/0143164 A1 May 16, 2019

(30) Foreign Application Priority Data
May 2, 2016 (EP) .................................. 16167862

(51) Int. Cl.
*A63B 5/11* (2006.01)
*F16B 5/06* (2006.01)
(Continued)

(52) U.S. Cl.
CPC ............. *A63B 5/11* (2013.01); *A63B 21/0557* (2013.01); *F16B 5/0692* (2013.01); *A63B 21/0552* (2013.01); *F16B 45/00* (2013.01)

(58) Field of Classification Search
CPC ... A63B 5/11; A63B 21/0052; A63B 21/0557; F16B 5/06; F16B 5/0692; F16B 45/00
See application file for complete search history.

(56) References Cited

U.S. PATENT DOCUMENTS 2,916,746 A * 12/1959 Pease ....................... A63B 5/11
482/27
3,058,184 A * 10/1962 Ritzheimer ........... F16G 11/143
24/115 R
(Continued)

FOREIGN PATENT DOCUMENTS

| DE | 102 26 707 A1 | 1/2004 |
| EP | 2 540 352 A1 | 1/2013 |
| WO | WO 00/09294 A1 | 2/2000 |

OTHER PUBLICATIONS

Written Opinion of the International Searching Authority of International Application No. PCT/EP2017/060388 dated Jul. 26, 2017 and English Translation, 11 pages.
(Continued)

Primary Examiner — Loan B Jimenez
Assistant Examiner — Zachary T Moore
(74) Attorney, Agent, or Firm — Fay Sharpe LLP

(57) ABSTRACT

A cord hook for fastening a jump mat to a trampoline frame includes a holding section for holding a first and a second loop end section of the cord loop and a fastening section for fastening the flexible band element, wherein a main tension vector (V) is defined by tension at the band element. The hook has a transition section connecting the holding section and the fastening section and is designed in such a way that a straight line (g) through the main tension vector (V) divides the holding space into a first partial space and a second partial space in such a way that, when the cord hook is used as intended, the first loop end section lies in the first partial space and the second loop end section lies in the
(Continued)

second partial space. Also disclosed are a trampoline and a method for fastening the jump mat.

14 Claims, 9 Drawing Sheets

(51) Int. Cl.
  *A63B 21/055* (2006.01)
  *F16B 45/00* (2006.01)

(56) References Cited

U.S. PATENT DOCUMENTS

| | | |
|---|---|---|
| 3,356,366 A | 12/1967 | Barthel |
| 6,543,094 B2* | 4/2003 | D'Addario .............. F16L 3/233 24/16 PB |
| 8,038,580 B2* | 10/2011 | Pieper Genannt Schmauck ......... A63B 5/11 482/27 |
| 2003/0223808 A1* | 12/2003 | Kuo ................... A63B 21/1609 403/220 |
| 2013/0014352 A1 | 1/2013 | Wells |
| 2013/0316876 A1* | 11/2013 | Publicover ............... A63B 5/11 482/27 |
| 2014/0228180 A1* | 8/2014 | Walker ..................... A63B 5/20 482/82 |
| 2016/0096056 A1* | 4/2016 | de Boer ................... A63B 5/11 482/27 |
| 2016/0296782 A1* | 10/2016 | Dai .................... A63B 21/0557 |

OTHER PUBLICATIONS

International Search Report of International Application No. PCT/EP2017/060388 dated Jul. 26, 2017, 4 pages.

* cited by examiner

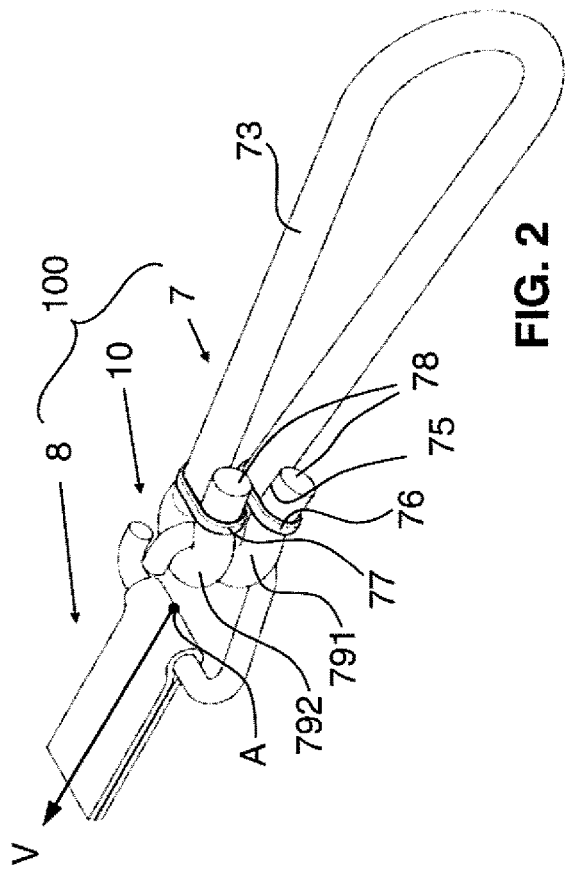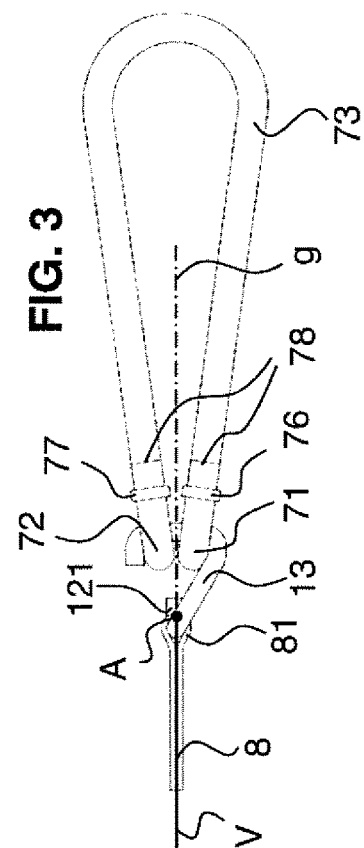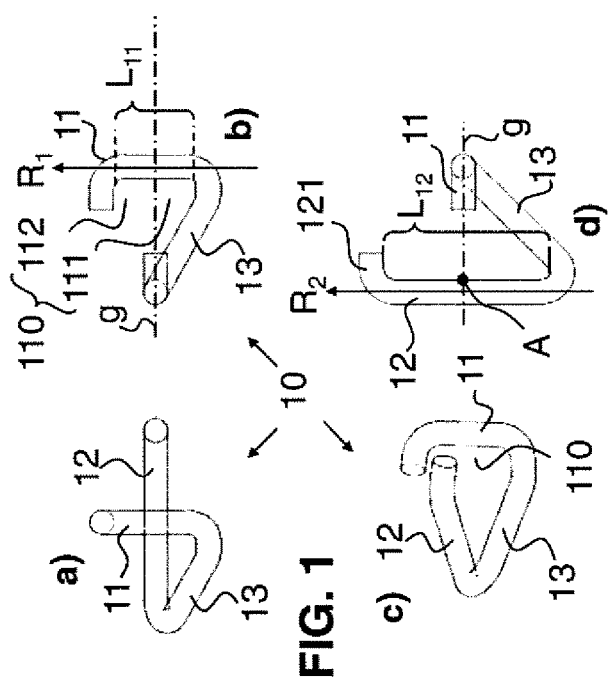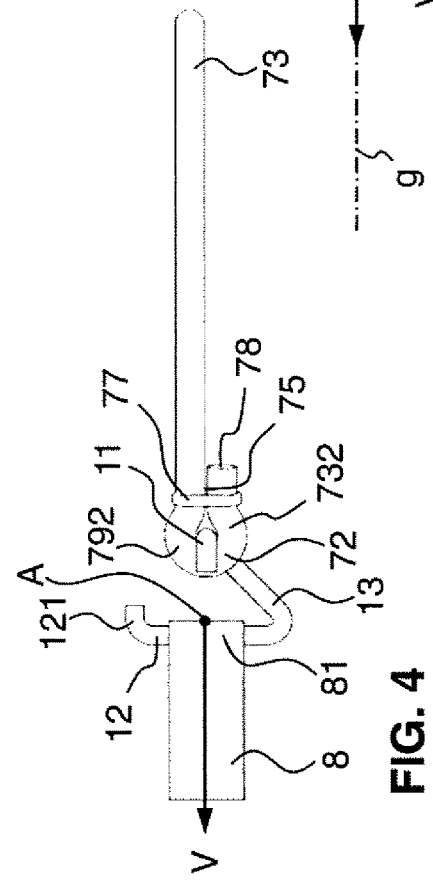
FIG. 1
FIG. 2
FIG. 3
FIG. 4

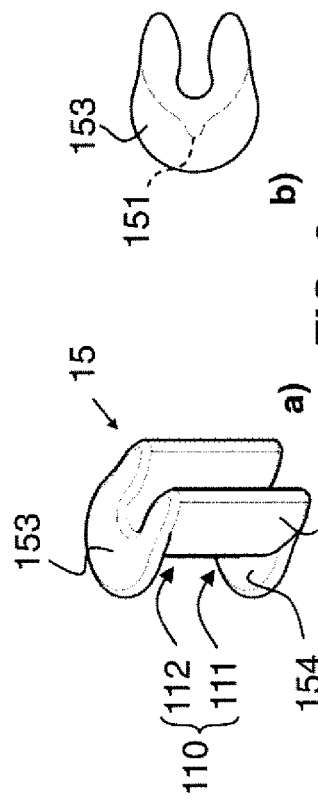
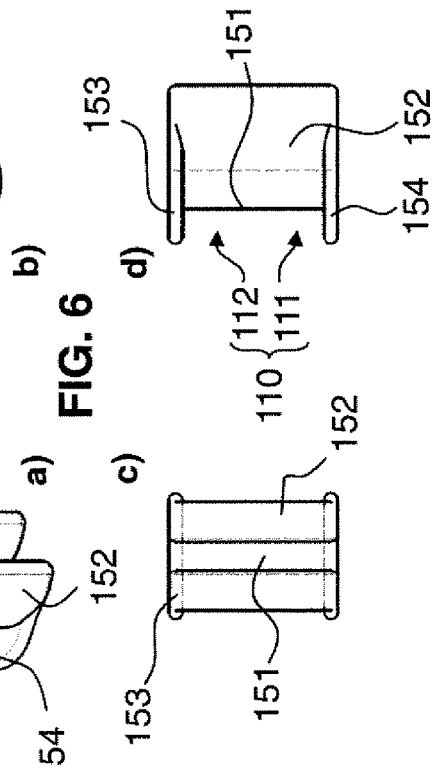
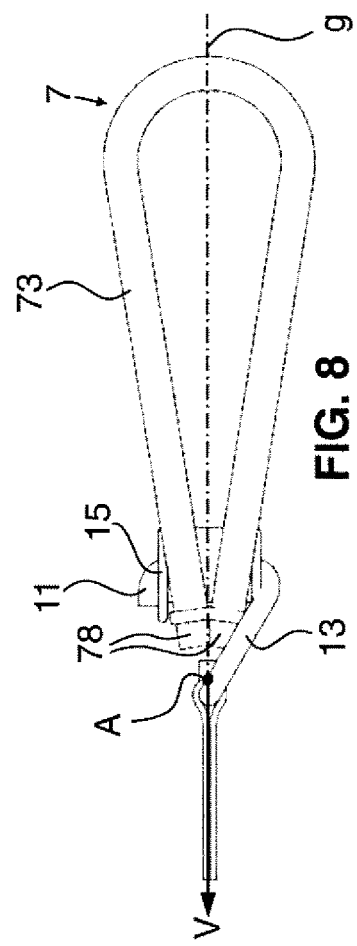
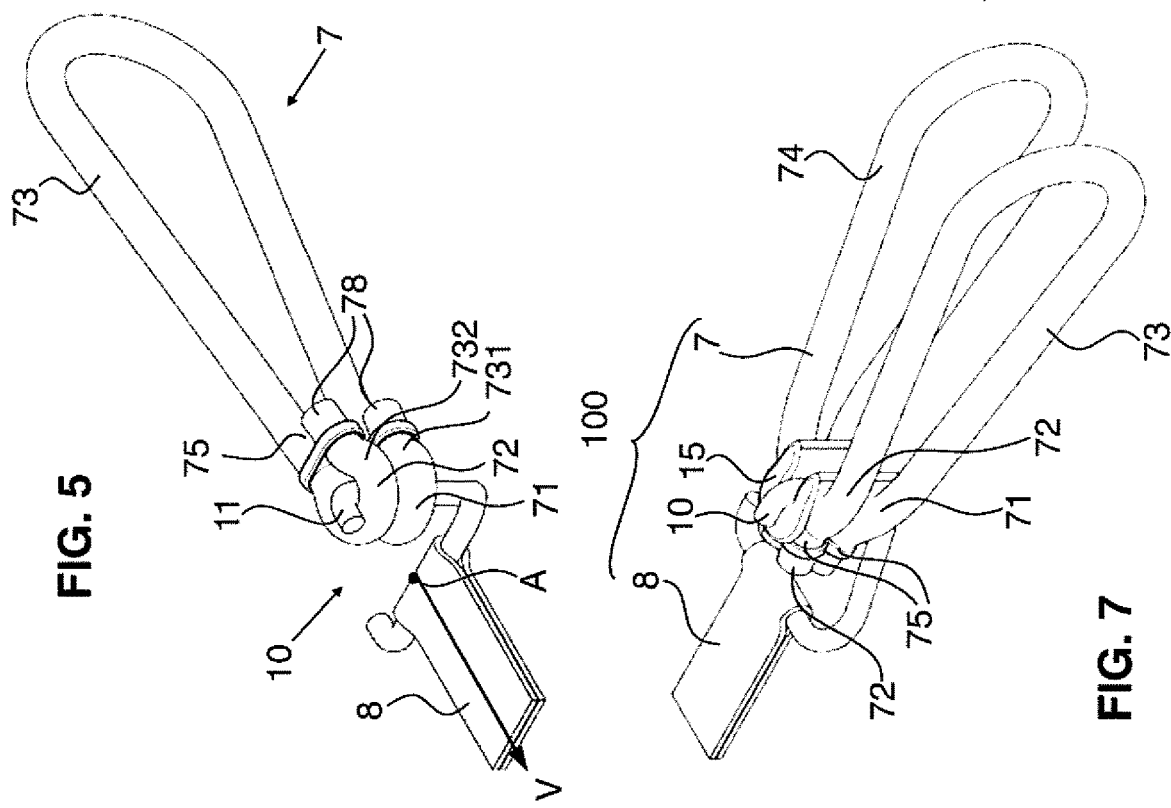
FIG. 5
FIG. 6
FIG. 7
FIG. 8

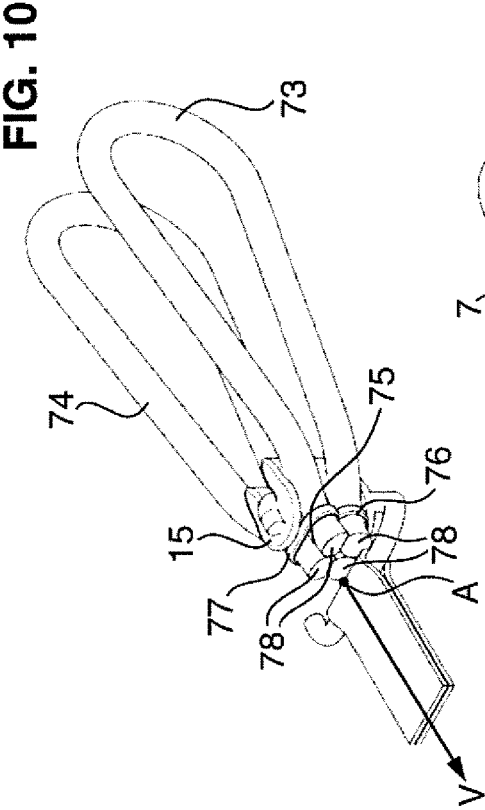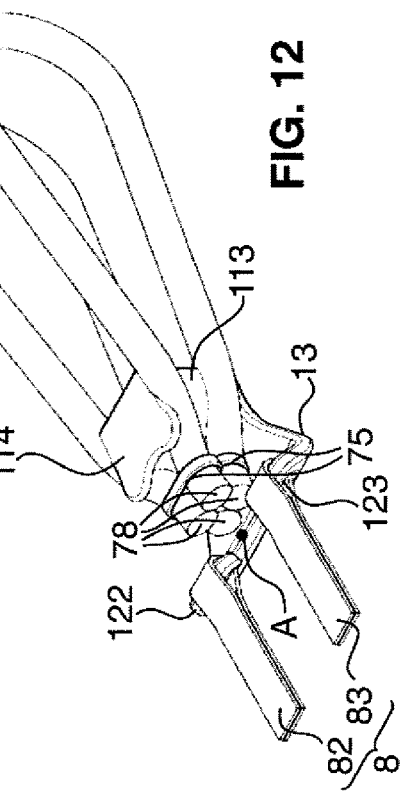

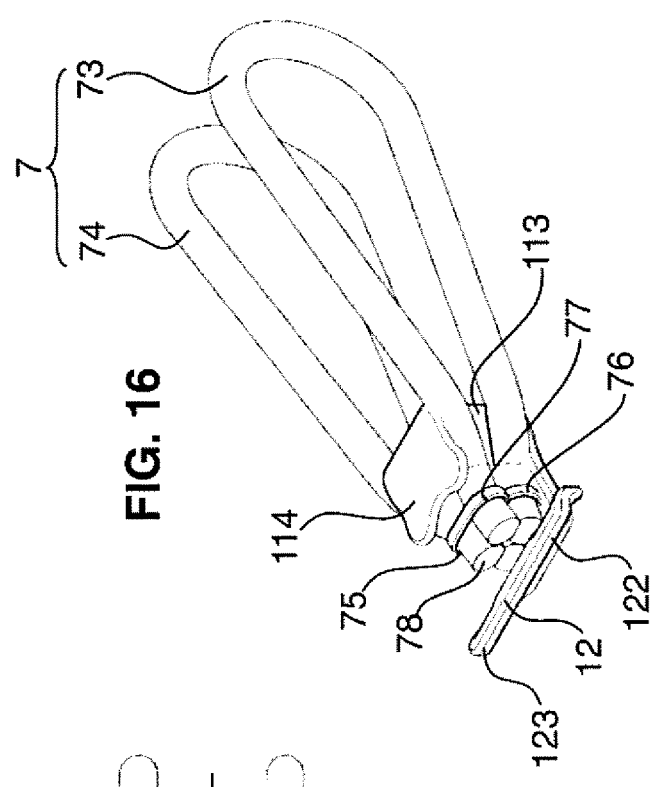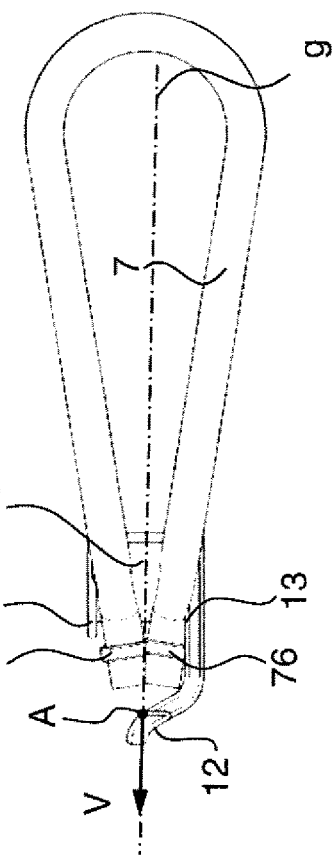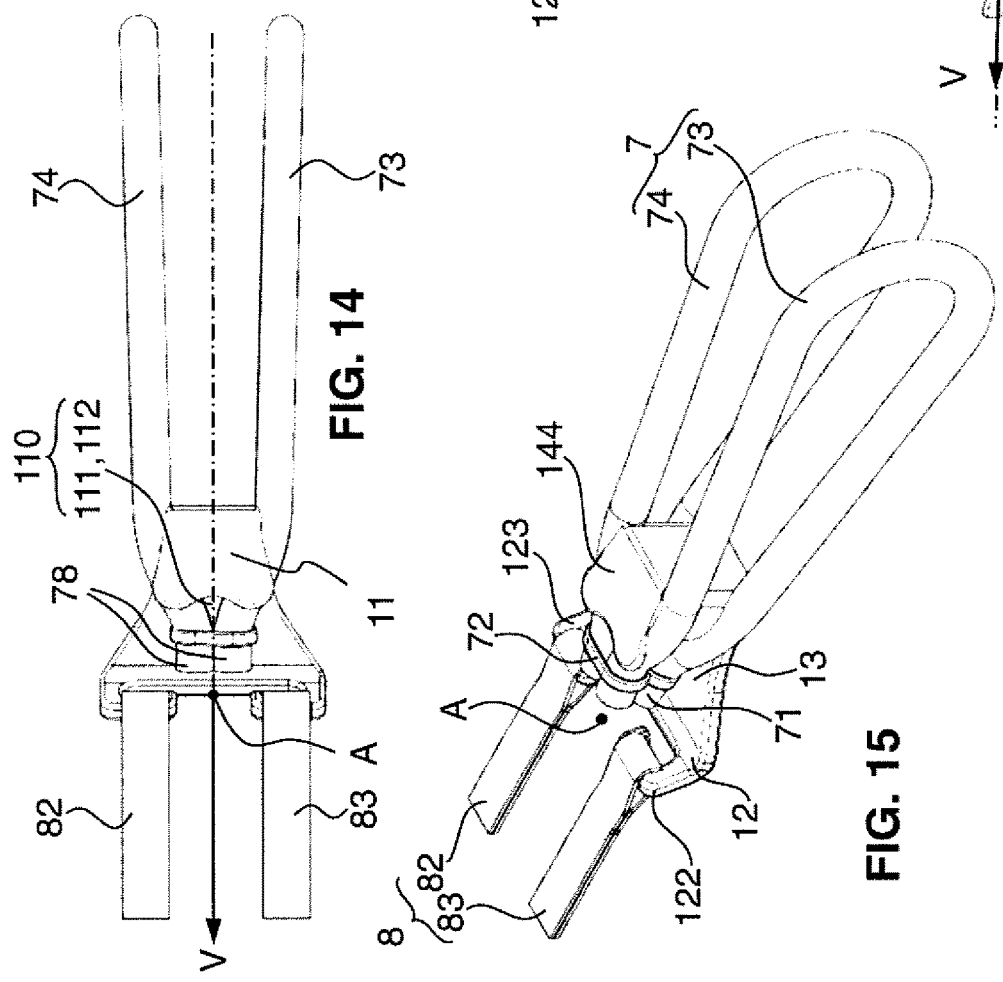

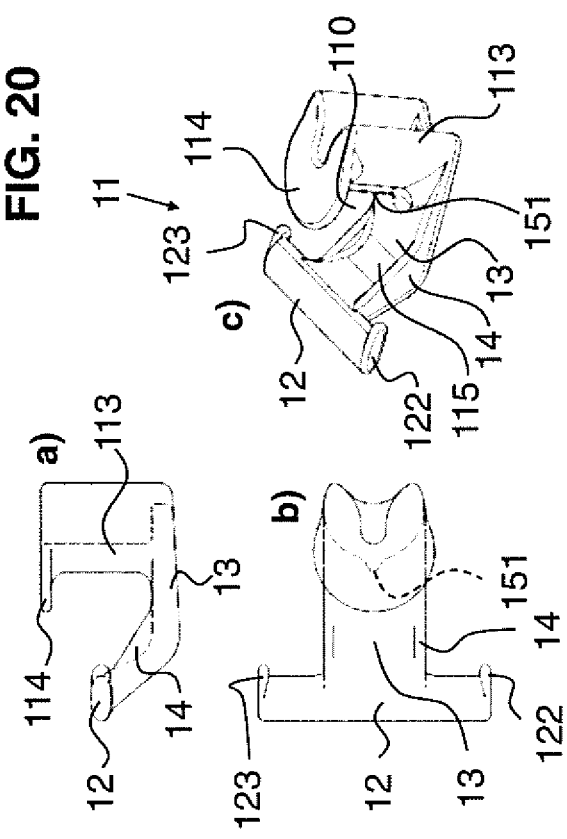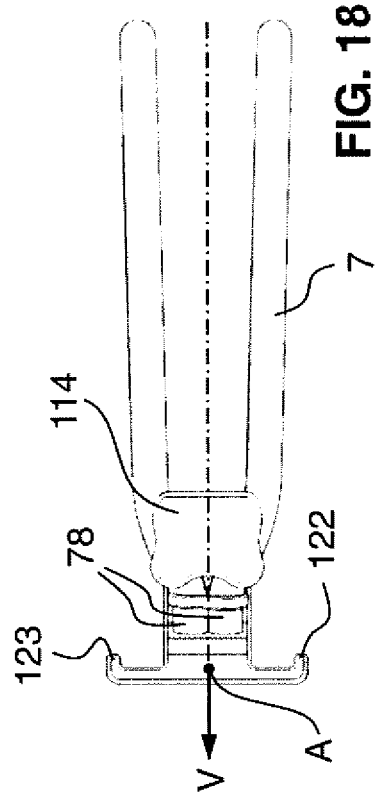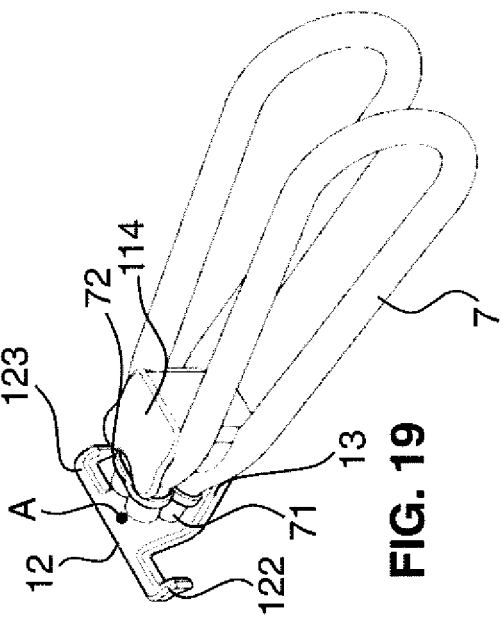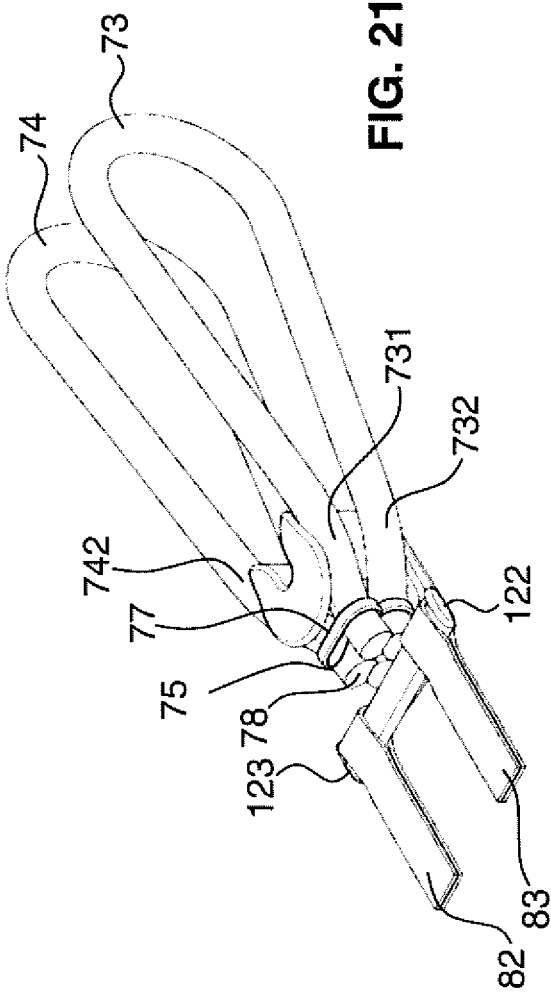

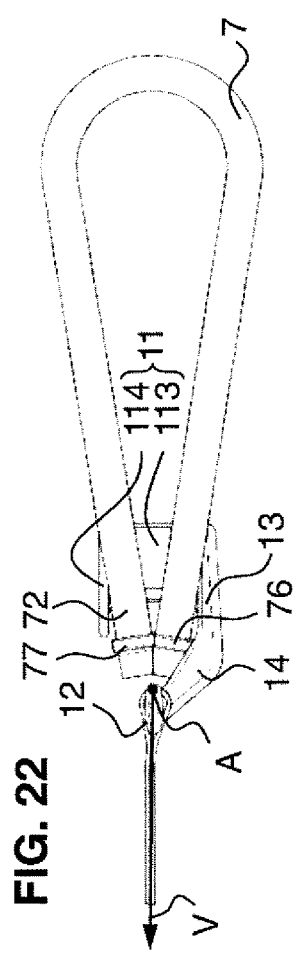
FIG. 22
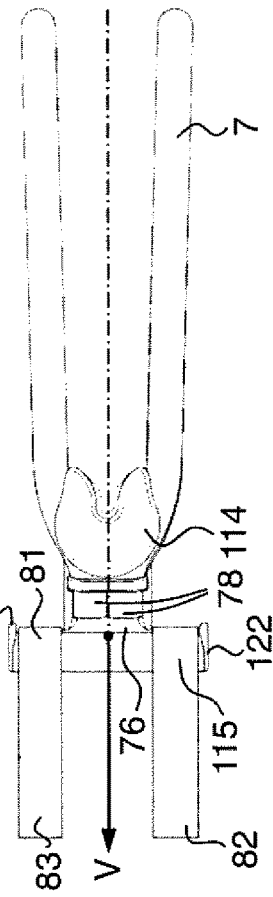
FIG. 23
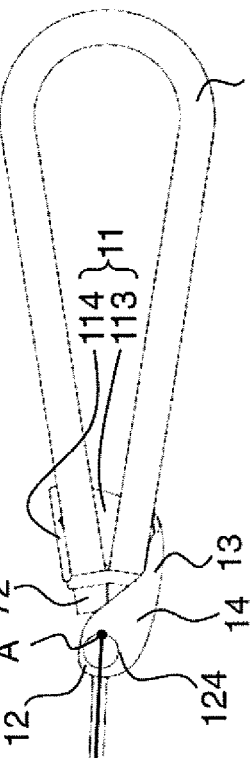
FIG. 25
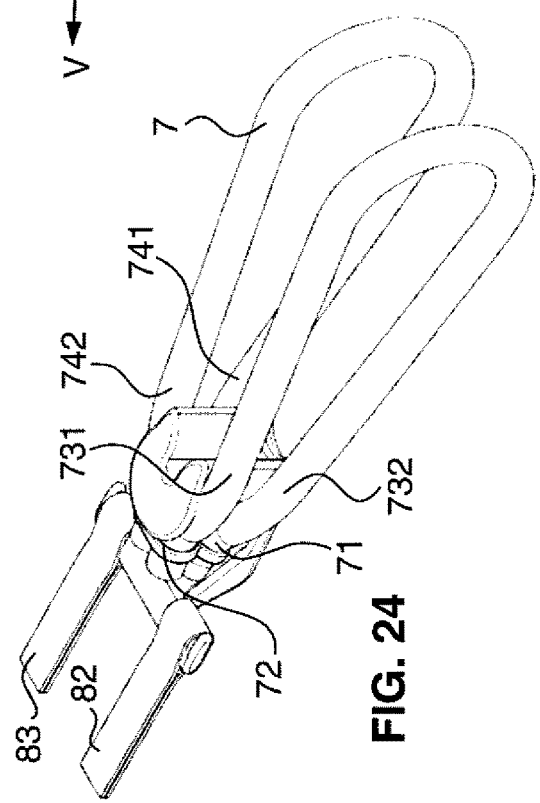
FIG. 24
FIG. 26

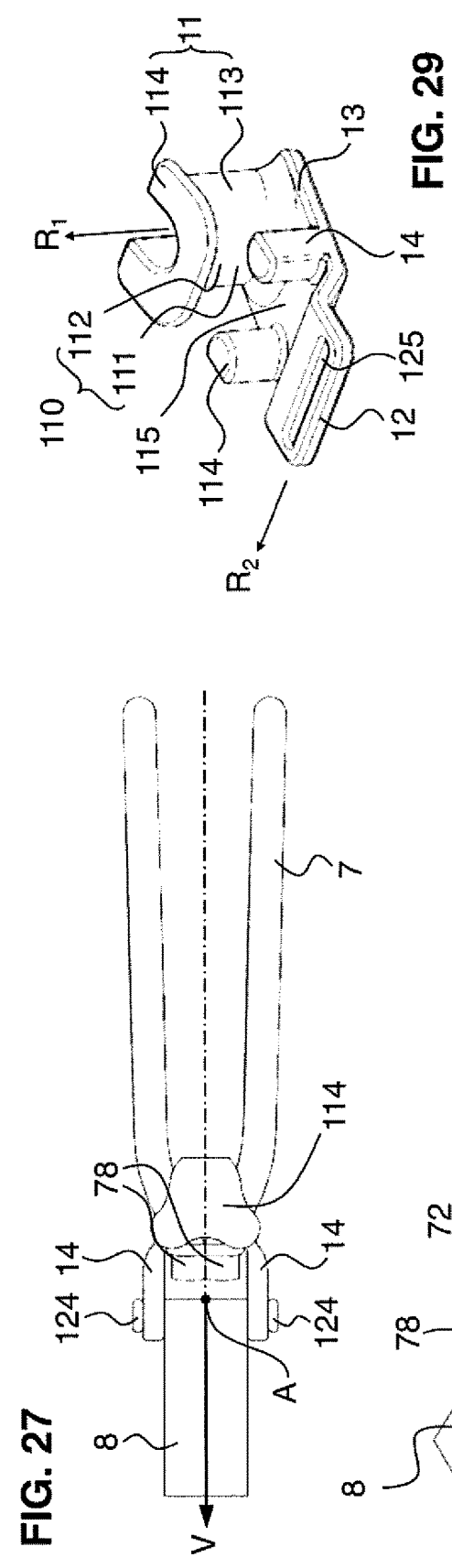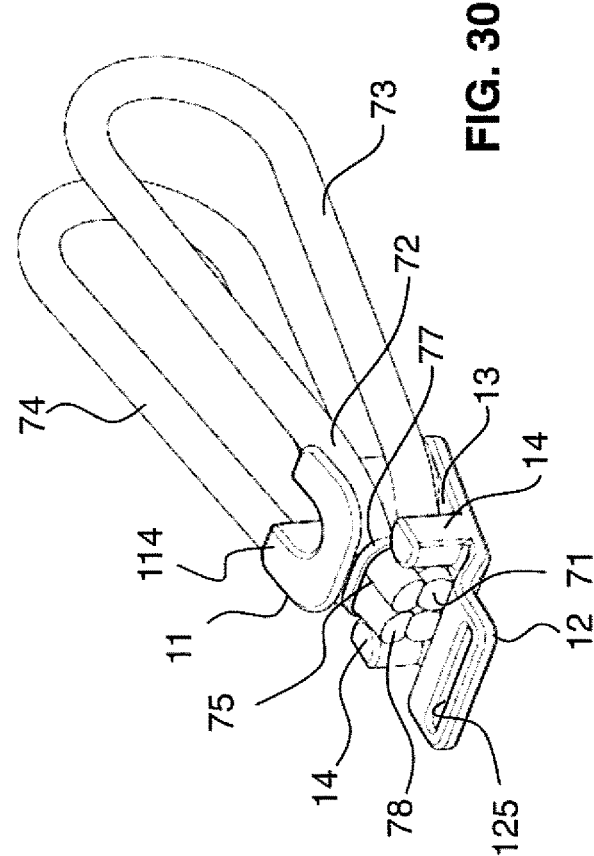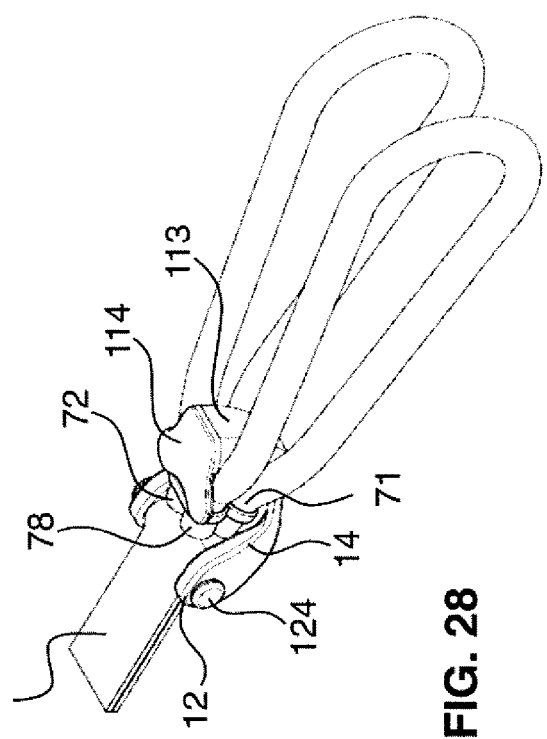

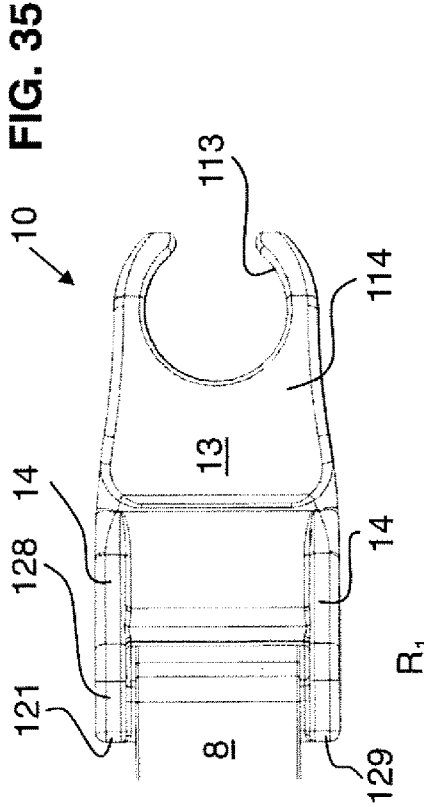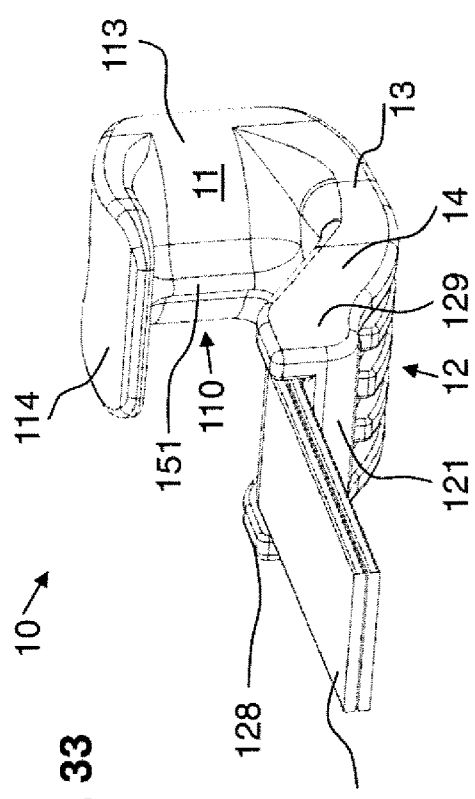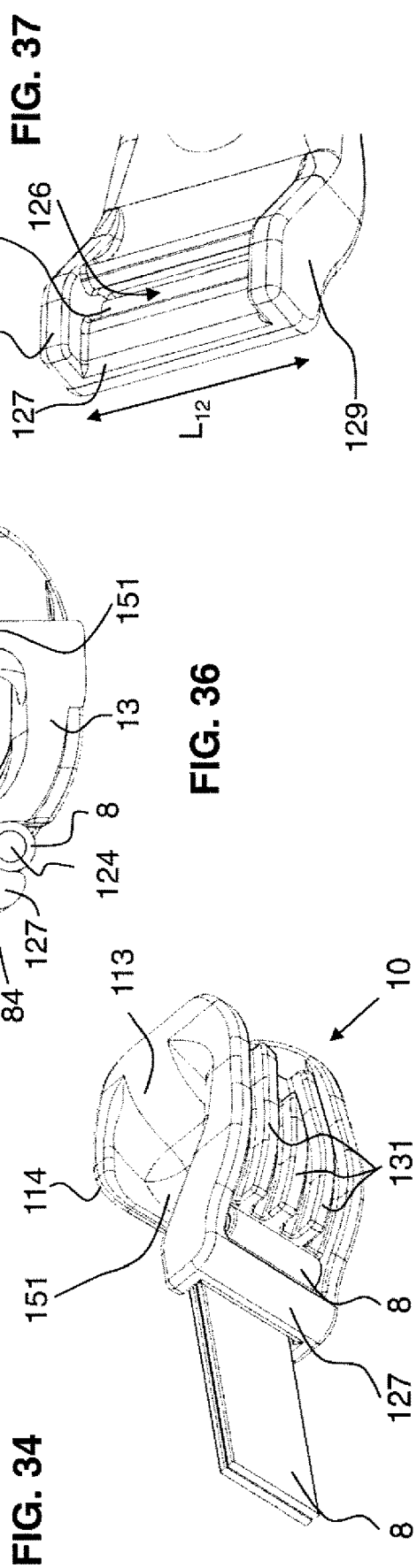

FASTENING DEVICE FOR A TRAMPOLINE

TECHNICAL FIELD

The present invention is concerned with a cord hook of a securing device for a trampoline, with a securing device of said type for the insertion of a jump mat of the trampoline into the frame device of the trampoline.

PRIOR ART

Trampolines, or mini trampolines, which are used for the promotion of health and for therapy purposes, require a suitable securing system, which is capable of oscillating, for the securing and tensioning or mounting of the jump mat.

It is known for the jump mat to be secured in frame devices of mini trampolines using steel springs. Steel-spring-based suspension arrangements however have the disadvantage that they tension the jump mat so as to be very taut. Furthermore, the steel springs give rise to disturbing squeaking noises during the use of the trampoline. When swinging or lightly jumping on steel-spring mini trampolines, a sinking depth to which the person exercising sinks into the mat amounts to just 20 millimeters to 60 millimeters, which corresponds to the damping braking travel upon impact. The impact forces are reduced only slightly by means of the steel spring tensioning arrangement. When training on devices with such a suspension arrangement of the jump mat, joints and the spinal column are therefore subjected to considerable loads.

DE 102 26 707 A1 describes a tensioning arrangement which operates using elastic cord loops and cord hooks rather than steel springs. The rubber cord method offers much greater elasticity, that is to say longer damping travels and therefore softer damping characteristics, which are often preferred in particular in the physiotherapy sector. The sinking depth in the case of mini trampolines is thus increased, and may amount to approximately 100 millimeters to 250 millimeters. This permits a more harmonious swinging movement and softer braking.

EP 2 540 352 has disclosed a further development of a cord hook for trampolines. The further development proposes providing a hook element with a first and with a second receiving portion, wherein the two receiving portions are separated from one another by a web with a rear tab element. The tab element is secured to the mat of the trampoline. Cord loops are used which are formed from a rubber cord portion, wherein end portions of the cord portion are laid so as to overlap one another pointing in different directions, and are fixed to form a ring. For the fixing of the cord loops, in the overlap zone, two sausage-shaped brackets are arranged adjacent to one another, with a spacing of 10 millimeters to 12 millimeters, so as to engage over the end portions running toward one another, and are firmly compressed. In the tensioning arrangement, the cord loop is mounted into the first receiving portion, is looped around the frame device, is led back to the hook element, and is mounted there in the second receiving portion. The web that separates the first and second receiving portions ensures that the cord portions situated in the first receiving portion and in the second receiving portion are supported separately from one another and do not rub against one another, whereby wear resistance is improved. It is therefore the case that four cord portions of the cord loop extend away from this double hook construction, which cord portions brace the mat to the frame.

Of these four cord portions which extend away from the hook element, three of these have equally long active tension sections. The fourth cord portion has the above-described sausage-shaped bracket assembly, which disadvantageously reduces the active tension section thereof. In the middle of the tension section, the brackets form a rigid block, which shortens the rubber section available for the stretching to approximately 20 millimeters. This can affect more than 20 percent of the respective partial cord portion.

Owing to the resulting tension length difference, the cord portions of the tensioned cord loop behave differently under load. The fourth cord portion with the sausage-shaped brackets is subjected to much greater load than the other three cord portions, and more quickly reaches the maximum stretching length under load owing to the shortened active rubber cord portion. This firstly influences the oscillation quality, because it is not possible for the entire stretching potential of the rubber to be utilized uniformly for generating the oscillation. Secondly, the overstretching, which occurs earlier, of the fourth cord portion leads to faster stress aging, as a result of which the cord loop must be prematurely exchanged.

PRESENTATION OF THE INVENTION

It is an object of the present invention to specify a cord hook which further improves the securing of a jump mat in a trampoline frame.

Said object is achieved by means of a cord hook as claimed in claim 1. According to said claim, a cord hook for securing a jump mat to a trampoline frame by means of a cord loop and at least one flexible band element is proposed. Here, the cord hook comprises the following features:

a distal receiving portion, wherein the receiving portion extends along a first direction and defines a receiving space for receiving a first and a second loop end portion of the cord loop;

a proximal securing portion, which extends along a second direction and which is designed such that a distal end portion of the at least one flexible band element can be secured thereto and a main tension vector is defined by tension on a proximal end portion of the at least one flexible band element; and a transition portion which connects the receiving portion and the securing portion to one another and which thus delimits the receiving space on one side, specifically counter to the distal direction.

Here, the object is achieved in that the cord hook is designed such that a straight line through the main tension vector of the cord hook tensioned in the intended manner by means of the cord loop and the at least one preferably flexible band element divides the receiving space into a first partial space and a second partial space such that, during intended use of the cord hook, the first loop end portion lies in the first partial space and the second loop end portion lies in the second partial space.

The invention is based inter alia on the realization that a transition portion which moves away laterally is advantageous for the design of the cord hook. In particular, in this way, it is possible to avoid transverse forces on the cord hook that tilt the hook during intended use.

Here, the cord hook is preferably designed as a single hook, that is to say the cord hook has a single receiving portion into which the loop end portions are mounted. The receiving portion defines the receiving space, wherein the receiving space is a coherent space without a structural division, such that the first partial space and the second partial space are only virtually separated from one another, and not, as is the case for example in the teaching of EP 2 540 352, by the arrangement of structural features such as for example of the web, which web divides the receiving space into separate receiving spaces. In this context, the teaching of EP 2 540 352 thus concerns a double hook, that is to say a hook with two entirely separate receiving portions, which provide separate receiving spaces for in each case one loop end portion.

In the context of the present invention, the expression "main tension vector" is to be understood to mean a vector in the mathematical sense, which extends from the effective action point of a resultant force, which is exerted on or transmitted to the cord hook by the at least one band element, parallel to the resultant force toward the jump mat. This consideration with the main tension vector is performed in the tensioned state, when no external weight is acting on the jump mat. If for example the securing portion provides two separate partial portions for receiving two band elements which run parallel to one another in the tensioned state and which each exert the same force on the cord hook, then the effective action point is substantially the central point of the connecting path of the two separate partial portions. Owing to the action of the resultant force, a proximal hook portion is blocked, and a distal hook portion, the receiving portion, is set substantially vertical counter to the tension force in the direction of the trampoline frame.

In one refinement, this cord hook is designed such that the first direction and the second direction run transversely with respect to one another. An angle between the two directions may in this case amount to for example 80° to 100° and in particular 90°. Here, the securing portion may run either perpendicular to the main tension vector or parallel to the main tension vector. It is particularly preferable for the securing portion to be arranged both perpendicular to the receiving portion, that is to say to the first direction, and perpendicular to the main tension vector. This makes it possible for the securing portion itself to perform a hook-like function, wherein the band element may be formed as a loop with a distal and a proximal end, wherein the distal band element end is simply pushed over the entirety or a part of the securing portion and the proximal end of the band element is connected to the jump mat.

The cord hook is preferably furthermore designed such that the straight line through the main tension vector intersects the receiving portion centrally with respect to a longitudinal extent along the first direction. By means of this configuration, the receiving space is divided into two partial spaces of approximately equal size, that is to say the first receiving space is of approximately equal size to the second receiving space. In this way, a compact cord hook can be provided.

In a yet further refinement of the cord hook, the straight line through the main tension vector intersects the securing portion centrally with respect to a longitudinal extent along the second direction.

It is particularly preferable if a center of the receiving portion and a center of the securing portion lie on the straight line. In this way, during intended use, only a minimal twisting moment acts on the cord hook.

In one exemplary embodiment, the cord hook is formed from a single-piece wire element. This permits both particularly simple and cost-efficient production of a robust hook.

In one refinement, the wire hook is equipped with an additional sleeve. Said additional sleeve may be manufactured from plastic or from some other material. The additional sleeve may in particular be formed in one piece. The additional sleeve has a cross section which is larger than the wire cross section. Correspondingly, the additional sleeve can be arranged over the wire portion which provides the receiving space, the receiving portion, and surrounds this at least toward the receiving space and preferably to both sides. The additional sleeve may for example be provided such that it can be snapped or plugged onto the receiving portion. The additional sleeve inserted into the receiving space then defines the first and second partial spaces and increases the size of the effective cross section of the hook in the region of the first and second partial spaces, that is to say where cord portions of the cord loop come to lie. By means of the widening of the cross section, those cord portions of the cord loop which proceed from the cord hook are spatially separated from one another to a greater extent, which prevents disadvantageous contact between the cord portions under rhythmic loading.

The additional sleeve preferably has a vertical ridge which projects centrally into the receiving space, that is to say in the proximal direction. The vertical ridge may extend continuously from the first partial space into the second partial space, though may also be interrupted. A vertical ridge of said type may be provided in every embodiment described below.

The vertical ridges described in the context of the present application may for example have a ridge height and width of 1 millimeter to 5 millimeters. Its free, proximally direct end has preferably a rounded form, such that the cord loop is not subjected to any sharp edges. The function of the vertical ridge will be described in more detail below.

In one exemplary embodiment, the cord hook may also be formed as a preferably single-piece plastics part or metal part. This hook may also, in one refinement, have a vertical ridge which extends in the receiving space preferably from the first partial space into the second partial space and which serves for centering a clamping region of a cord loop in the receiving space.

To realize the function of the centering of the clamping region, the loop may be realized not only proceeding from the inside by means of the vertical ridge but also from outside the loop through the provision of at least one laterally arranged abutment element on the transition portion of the cord hook. The abutment element is arranged such that a clamping region of a mounted cord loop end portion lies against the abutment element and is thus fixed there. It is preferable for abutment elements to be arranged on the transition portion on both sides of the clamping region, such that the clamping region is fixed to both sides.

The abutment element extends preferably in the direction of the main tension vector so as to be spaced apart from the receiving portion, and, at least in sections, parallel to the receiving portion along the first direction away from the transition portion. The material removal height of the transition portion may in this case be selected such that only the first partial space or preferably the first partial space and the second partial space is/are partially or entirely laterally proximally delimited, such that the centering of the clamping region of the cord loop on the one abutment element or between two abutment elements is ensured.

Depending on the embodiment, a vertical ridge and/or one or two laterally arranged abutment elements may be provided. It is thus a further aspect of the present invention to provide a vertical ridge and/or at least one lateral abutment element, such that a lateral guide arrangement is formed which secures a clamping region, that is to say a connecting point, of the loop against lateral slippage of the loop along the loop.

It is a further object of the present invention to specify a securing system which improves the securing of a jump mat in a trampoline frame.

Said object is achieved by means of a cord hook as claimed in claim 7. According to said claim, a securing system for securing a jump mat to a trampoline frame is proposed, wherein the securing system comprises a multiplicity of cord hooks as described above in the context of the invention and a multiplicity of preferably elastic cord loops.

The securing system is preferably composed of an equal number of cord hooks of said type and elastic cord loops and of at least one flexible band element for each cord hook.

The band element may for example be composed of a woven or non-woven textile and/or of a single-ply or multi-ply plastics foil. It is preferable for the band element to be flexible but to exhibit low elasticity or no elasticity with regard to its length. It is however also conceivable to use an elastic band element.

In one refinement or an alternative embodiment of the securing system for securing a jump mat to a trampoline frame, the securing system comprises a multiplicity of such cord hooks and cord loops.

In a particularly preferred embodiment, the cord loop is designed in each case so as to be formed from a first cord portion with a first end portion and with a second end portion. The first end portion and the second end portion are laid parallel to and adjacent to one another and are clamped together in a clamping region such that free portions of those end portions which are clamped together in each case point in the same direction. The clamping is preferably realized by means of clamping elements such as brackets or clamping sleeves. These clamping elements may for example be manufactured from metal, whereby firm and secure clamping of the end portions is possible. Other clamping elements are conceivable.

In an alternative embodiment, the cord loops are in each case designed so as to be formed from a first cord portion and a second cord portion. Use is thus made of two separate cord portions, which are clamped together.

Each cord portion has in each case one first end portion and one second end portion. In an embodiment with only one cord portion, the first end portion of the first cord portion is clamped to the second end portion of the first cord portion, whereby a clamping region is formed. In an embodiment with two cord portions, the first end portion of the first cord portion is clamped to the second end portion of the second cord portion, and the second end portion of the first cord portion is clamped to the first end portion of the second cord portion, whereby two clamping regions situated oppositely in the loop are formed.

The clamping regions may be realized in each case by means of the abovementioned clamping elements. Again, those end portions which are clamped together are laid parallel to one another such that free portions of those end portions which are clamped together in each case point in the same direction.

The clamping region can be mounted together with clamping element into the first or second partial space of the corresponding cord hook.

The present invention also relates to the use of a cord loop of said type.

If a cord loop of said type is used for example with a wire hook as described above, this leads to a fixing of the cord loop end portion in the receiving space. The wire hook has, in the region of the receiving space, a relatively small structural width of substantially the wire diameter or a multiple thereof. In this way, the loop end portion, mounted into the receiving space, with the clamping region is automatically centered, owing to the narrow structural form, on the hook, because the wire element, in the space between the two end portions, presses against the clamping element and thus fixes the cord loop against lateral displacement.

If use is additionally now made of an additional sleeve on the wire element, then the above-described vertical ridge, which extends over at least the partial space or the entire receiving space, can be utilized to ensure the fixing of the clamping region in the receiving space—as discussed above with regard to the wire hook. At the same time, however, the structural width is increased by the additional sleeve from the wire diameter to the diameter of the additional sleeve. It can thus be achieved in a targeted manner that the cord portions proceeding from the additional sleeve to the trampoline frame run so as to be spatially separated from one another to a greater extent. In this way, contact between the cord portions under load is prevented, which results in an improved oscillation and improved wear resistance.

Instead of a cord hook formed from wire, use may also be made of a hook composed of plastic or of some other material, for example aluminum. The structural form of the hook may then have the vertical ridge which is described above in conjunction with the additional sleeve and which acts on the cord loop at the inner side, and thus perform the centering function. Said vertical ridge may for example be integrated directly into a relevant plastics hook. Furthermore, the distribution and number of the securing elements of the tension section relevant for the oscillation, or the overall length of the elastic cord along the circumference of the trampoline frame, can be optimized.

In one refinement, a structural width of the hook in the region of the receiving space can be selected such that the cord portions proceeding from the plastics hook run spatially separately from one another between trampoline frame and cord hook, whereby said cord portions do not make contact with one another even under load, which further increases wear resistance.

In addition or alternatively, the hook not formed from wire may have one or more abutment elements for the fixing of the cord loop from the outside, as described above.

In one refinement, the cord hook is equipped with a securing portion which comprises open hook elements. By virtue of the fact that the securing portion does not have a closed ring shape but rather has an open hook shape, a preferably flexible band element already connected to the jump mat can be easily mounted into the open hook. The securing of the cord hook to the jump mat, and the exchange of the cord hook in the event of damage, are thus particularly straightforward.

In an alternative embodiment of the securing system, the securing system for securing a jump mat to a trampoline frame comprises a multiplicity of cord hooks, wherein the securing system is designed in particular as described above, wherein the cord loop is formed from a first cord portion, wherein each cord portion has in each case one first end portion and one second end portion, and wherein the first and second end portions are each bent to form a first and a second closed bight and are fixedly clamped in each case by means of at least one clamping element, wherein the first and second bight form eyelets which can be mounted into the first and second partial space of the corresponding cord hook.

In this alternative embodiment of the cord loop, provision is likewise made of a first cord portion which has a first and a second end portion. Each end portion is turned in to form a loop or a bight and, by means of a yet further clamping, for example by means of the abovementioned bracket method, the distal free portion of the respective end portion is clamped to the proximal region of the same end portion. In this way, at each end of the cord portion, a small loop, that is to say an eyelet, is provided, which can then be mounted into the receiving portion of the cord hook. It is however the case here that, when the loop is tensioned, the clamping region is arranged no longer in the receiving space of the cord hook but rather behind the cord hook in the direction of the cord portion.

The tension sections of the cord strands running between frame and hook are in each case equal in all cord loops, such that premature wear of one cord strand can be prevented.

The present invention also relates to a trampoline having a jump mat and having a trampoline frame, wherein the trampoline furthermore comprises a securing system as described above, by means of which the jump mat is mounted in the trampoline frame.

In one refinement, the trampoline comprises a securing system as described above, wherein the cord loops are in each case tensioned such that the clamping region lies in each case in the first or in the second partial space of the corresponding cord hook.

In another refinement, the trampoline comprises a securing system as described above, wherein the first and second cord loop end portions are mounted into the first and second partial space of the corresponding cord hooks.

The present invention also relates to the use of a cord hook as described above or of a securing system as described above for connecting a jump mat to a trampoline frame.

It is furthermore an object of the present invention to specify a method which improves the securing of a jump mat to a trampoline frame.

Said object is achieved by means of the method as claimed in claim 13. According to said claim, a method for securing a jump mat to a trampoline frame having the following method steps is proposed:

i) providing a securing system as described above;
ii) looping the cord loop around a portion of the trampoline frame and mounting the first and the second loop end portion into the receiving space of the cord hook in order to tension the jump mat in the trampoline frame, wherein the cord hooks are secured to the jump mat preferably by means of in each case at least one flexible band element.

One embodiment of a method for securing a jump mat in a trampoline frame by means of a securing system having a multiplicity of cord hooks and elastic cord loops, wherein the method is in particular the method described above, is characterized in that the cord loop is formed from a first cord portion or from a first cord portion and a second cord portion, wherein each cord portion has in each case one first end portion and one second end portion, wherein the first end portion of the first cord portion is clamped to the second end portion of the first or possibly of the second cord portion in a clamping region, and the second end portion of the first cord portion is clamped to the first end portion of the first or of the second cord portion respectively in a clamping region, such that the free portions of those end portions which are clamped together in each case point in the same direction, wherein the clamping region is mounted into the first or second partial space of the corresponding cord hook.

The cord hook is preferably equipped with at least one or more abutment elements, as described above, for fixing the free portions of the cord loops in the receiving space.

Alternatively, in the case of this method, use may also be made of a securing system which comprises a multiplicity of cord hooks and elastic cord loops, wherein the securing system is in particular one of the securing systems described above. Here, each cord portion has in each case one first end portion and one second end portion, wherein the first and second end portions are in each case bent to form a first and a second loop and are fixedly clamped in each case by means of at least one clamping element, wherein the first and second loops are mounted into the first and second partial space of the corresponding cord hook.

According to a further aspect of the present invention, which may be used independently of but advantageously with the aspects described above, the cord hooks are designed such that the at least one band element can be mounted manually. This may for example be achieved by virtue of the securing portion of the corresponding cord hook having at least one outwardly or inwardly open hook element. It is self-evidently also conceivable for the corresponding securing portion to have two hook elements which are in each case outwardly or inwardly open. It is furthermore conceivable, instead of the hook elements, to use a bolt element which can be releasably mounted in the cord hooks. The band element is then looped around the bolt element before the bolt element is introduced into the cord hooks. By means of this possibility for mounting both the loop and the at least one band element, it is possible for a single defective cord hook to be easily exchanged even after the trampoline has been fully assembled. Furthermore, the mounting after the securing of the band elements is advantageous in terms of the production process, because the intermediate product composed of jump mat and band elements secured thereto is easier to handle, for example easier to stack, without cord hooks hanging therefrom.

BRIEF DESCRIPTION OF THE DRAWINGS

Preferred embodiments of the invention will be described below on the basis of the drawings, which serve merely for explanatory purposes and are not to be interpreted as limiting. In the drawings:

FIGS. 1*a-d* show views of a first embodiment of the cord hook according to the invention;

FIGS. 2-5 show views of the cord hook as per FIG. 1 with a first embodiment of a cord loop and with a first embodiment of a band element;

FIGS. 6*a-d* show views of an embodiment of an additional sleeve for the cord hook as per FIG. 1;

FIGS. 7-10 show views of the cord hook as per FIG. 1 with the additional sleeve as per FIG. 6, with a second embodiment of the cord loop and with the first embodiment of the band element as per FIGS. 2-5;

FIG. 11 shows a view of a trampoline;

FIGS. 12-15 show views of a second embodiment of the cord hook according to the invention with the second embodiment of the cord loop as per FIGS. 7-10 and with a second embodiment of a two-part band element;

FIGS. 16-19 show views of a third embodiment of the cord hook according to the invention with the second embodiment of the cord loop as per FIGS. 7-10;

FIGS. 20*a-c* show views of a fourth embodiment of the cord hook according to the invention;

FIGS. 21-24 show views of a fourth embodiment of the cord hook according to the invention with the second embodiment of the cord loop as per FIGS. 7-10 and with the second embodiment of the two-part band element as per FIGS. 12-15;

FIGS. 25-28 show views of a fifth embodiment of the cord hook according to the invention with the second embodiment of the cord loop as per FIGS. 7-10 and with the band element as per FIGS. 2-5;

FIG. 29 shows a view of a sixth embodiment of the cord hook according to the invention;

FIG. 30 shows a view of the sixth embodiment of the cord hook according to the invention as per FIG. 29 with the second embodiment of the cord loop as per FIGS. 7-10;

FIG. 33 shows a view of an eighth embodiment of the cord hook according to the invention;

FIGS. 34 to 35 show further views of the subject matter as per FIG. 33;

FIG. 36 shows a longitudinal sectional view of the subject matter as per FIG. 33; and FIG. 37 shows a detailed view of the subject matter as per FIG. 33.

DESCRIPTION OF PREFERRED EMBODIMENTS

Figure 31:
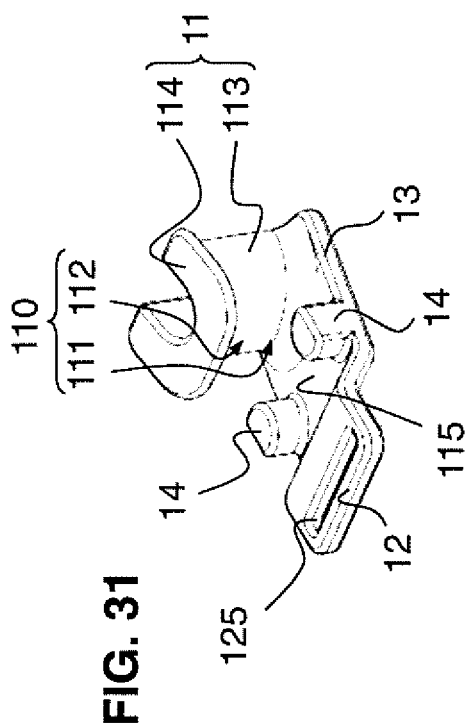
FIG. 31 shows a view of a seventh embodiment of the cord hook according to the invention.

Preferred embodiments of the present invention will now be described on the basis of FIGS. 1-32.

FIG. 1 is divided into four sub-figures a) to d) and shows a first embodiment of the cord hook 10. The cord hook 10 is formed in one piece from one wire piece. The cord hook 10 comprises a receiving portion 11, a securing portion 12 arranged transversely with respect thereto and spaced apart therefrom, and a transition portion 13, which connects the receiving portion 11 and the securing portion 12 to one another.

Sub-FIG. 1a) shows the cord hook 10 in a front view. The view is thus directed from the distal direction toward the receiving portion 11 and the securing portion 12 situated therebehind. In sub-FIG. 1b), the view is directed in a second direction $R_2$ of the securing portion 12. In sub-FIG. 1c), the view is directed perspectively from above toward the cord hook 10, and in sub-FIG. 1d), the view is directed from above toward the cord hook 10 counter to a first direction $R_1$ (see sub-FIG. 1b).

As illustrated in FIGS. 1a)-d), cord hook 10 is composed of a receiving portion 11 which runs in a straight manner substantially over its longitudinal extent $L_{11}$ in the first direction $R_1$ and which, at its free end, is bent through 90° so as to be directed toward the securing portion 12 and, at its other end, is connected to a distal end of the transition portion 13. The receiving portion 11 provides a receiving space 110 which is directed toward the securing portion 12. The end-side free curve of the receiving portion 11 delimits the receiving space 110 in an upward direction and serves for fixing loop end portions 71, 72, which have been mounted into the receiving portion 11 (see below and FIGS. 2-5), in the receiving space 110 with respect to the first direction $R_1$. The receiving portion 11 is furthermore dimensioned such that at least two loop end portions of a cord loop 7 (see FIG. 2) can be introduced into the receiving space 110. A typical length of the longitudinal extent $L_{11}$ of the receiving portion 11 amounts to for example substantially twice a diameter of the first cord portion 73 used for the loop 7 (see below).

The securing portion 12 likewise has a free end, which is bent through 90° so as to be directed toward the receiving portion 11. The two bent free ends are thus oriented in opposite directions. With the other end, the securing portion 12 transitions into a proximal end of the transition portion 13. Between the two ends, the securing portion 12 runs in a substantially straight manner over its longitudinal extent $L_{12}$ along the second direction $R_2$. The securing portion 12 is in this case designed such that the securing portion 12 can be mounted into a band element 8 (see FIGS. 2-5). A typical length of the longitudinal extent $L_{12}$ of the securing portion 12 is equal to or at least 50% longer than the receiving portion 11.

The transition portion 13 runs in a substantially straight manner between the receiving portion 11 and the securing portion 12 and is typically somewhat longer than the receiving portion 11 and somewhat shorter than the securing portion 12.

The dimensions of the cord hook 10 are advantageously selected such that the securing portion 12 can be mounted into a band element 8 and two loop end portions 71, 72 can be mounted into the receiving portion 11. A material and a material thickness should be selected such that the required stability of the cord hook 10 is ensured in the case of the tensioning arrangement typical for the mini trampoline 1 (see FIG. 11) and in the presence of the loading during intended use.

If, as shown in FIG. 1b), a straight line g is drawn through a central point of the securing portion 12 and through a central point of the receiving portion 11, said straight line g divides the receiving space 110 into a first partial space 111 and a second partial space 112. The straight line g is perpendicular to the first direction $R_1$ and to the second direction $R_2$.

The cord hook 10 is furthermore designed such that the first partial space 111 can be utilized for receiving the first loop end portion 71 and the second partial space 112 can be utilized for receiving the second loop end portion 72. This is shown in FIGS. 2-5.

The point of intersection between the straight line g and that surface of the securing portion 12 which is directed toward the receiving portion 11 defines an action point A. A main tension vector V runs from said action point A along the straight line g. The main tension vector V represents substantially the resultant force which is exerted by a band element 8 on the hook 10 in the tensioned state before the use of the trampoline 1. The main tension vector V is thus substantially perpendicular to the first direction $R_1$ and to the second direction $R_2$ and has its point of origin at the action point A.

FIG. 2 shows, in a perspective view from the front, the cord hook 10 as per FIG. 1 with the mounted cord loop 7 and the mounted band element 8. FIG. 3 shows a side view of the subject matter of FIG. 2. FIG. 4 shows a view from above of the subject matter of FIG. 2. FIG. 5 shows the subject matter of FIG. 2 from the rear, that is to say from the direction of the band element 8.

The cord hook 10 with the cord loop 7 and the band element 8 constitutes a securing system 100 as shown in FIGS. 2-5. FIGS. 2-5 show the securing system 100 in each case in the tensioned state.

FIGS. 2-32 illustrate three embodiments of the closed cord loop 7, manufactured from elastic rubber cord. A first embodiment of the cord loop 7 will now be described on the basis of the first embodiment of the cord hook 10 as per FIGS. 2-5.

The cord loop 7 according to the first embodiment as per FIGS. 2-5 has a first elastic cord portion 73. Said first cord portion 73 has a first end portion 731 and a second end portion 732. The two end portions 731, 732 are each turned over to form a closed bight. By means of a first clamping element 76, the first bight is shaped to form a fixed first loop 791. By means of a second clamping element 77, the second bight is shaped to form a fixed second loop 792. The two clamping elements 76, 77 are in this case metal brackets which fixedly clamp the corresponding cord portions together in a clamping region 75. The first and second loops 791, 792 are shaped such that the free portions 78 point in the direction of the first cord portion 73.

In FIGS. 2-5, the first and second loops 791, 792 have been inserted into the first and the second partial space 111, 112 respectively, and thus mounted in the receiving portion 11. The cord portion extending between the loops 791, 792 is led around a frame portion 90 of a trampoline frame 9 of the trampoline 1 as per FIG. 11.

The securing portion 12 is mounted into a band element 8 which is likewise formed in the manner of a loop. Said band element 8 is flexible and is connected to the jump mat 6 (see FIG. 11), for example is sewn to the mat 6. At the distal end 81, the band element 8 has an opening into which the securing portion 12 can be inserted.

The band element 8 is advantageously designed to exhibit considerably lower elasticity than the cord loop 7, or to be inelastic. In the tensioned state, the band element 8 exerts a force on the cord hook 10, such that the hook 10 retains the received loop end portion 71, 72 counter to the tension of the first cord portion 73. The force exerted by the band element 8 can be represented by the main tension vector V, which acts at the action point A of the cord hook 10 and points in the direction of the jump mat 6.

FIG. 6 illustrates an additional sleeve 15 for the refinement of the securing system 100 as per FIGS. 2-5 in four sub-FIGS. 6a)-6d).

This additional sleeve 15 has a U-shaped main body 152 extending along a longitudinal axis. At end sides in relation to the longitudinal axis of the main body 152, there are provided end plates 153, 154 which project beyond the main body 152 toward the bottom side of the U shape. The additional sleeve 15 is in this case designed such that the U shape of the main body 152 can be slid over the receiving portion 11 of the wire hook 10 as per FIG. 1. It is preferable for the side walls of the U shape to be slightly elastic and for the U shape to be designed such that it is possible for the U shape to be snapped onto the receiving portion 11 with a self-locking action. This may be achieved in particular by virtue of the receiving space of the U shape, toward the depth thereof, firstly narrowing and then widening again, as can be seen for example in FIG. 6b). These central cams then engage behind the receiving portion 11 in a blocking position.

The U shape has a bottom side and two limbs which project from said bottom side. On the bottom side opposite the receiving space of the U shape, there is formed a vertical ridge 151 which extends between the two end plates 153, 154. Said vertical ridge projects from the outer bottom side of the U shape by 1 millimeter to 3 millimeters. A length of the additional sleeve 15 is selected such that substantially the entire portion of the receiving portion 11 extending in a straight manner over the longitudinal extent $L_{12}$ is received in the receiving space of the U shape.

FIGS. 7-10 illustrate an alternative embodiment of the securing system 100. Firstly, the wire hook 10 as per FIG. 1 is shown, which is refined with the additional sleeve 15 as per FIG. 6. A second embodiment of the loop 7 is also illustrated.

The loop 7 as per the second embodiment has a first receiving portion 73 and additionally a second cord portion 74. The loop 7 is thus formed from two cord portions. The first cord portion 73 again has the first and second end portions 731, 732. The second cord portion 74 likewise has a first end portion 741 and a second end portion 742.

The loop 7 as per the second embodiment is now produced by virtue of the first cord portion 73 and the second cord portion 74 being laid parallel and adjacent to one another, such that firstly the first end portion 731 of the first cord portion 73 and the second end portion 742 of the second cord portion 74 make contact, and secondly also the second end portion 732 of the first cord portion 73 and the first end portion 741 of the second cord portion 74 make contact. The end portions 731, 742 and 732, 741 which are in contact are then fixedly clamped to one another by means of a first clamping element 76 and a second clamping element 77, whereby clamping regions 75 are formed in each case.

The clamping element 76, 77 may again be a pinchable metal bracket or metal sleeve which fixedly connects the corresponding end portions 731, 742 and 732, 741 to one another. Here, the two clamping regions 75 form the first loop end portion 71 and the second loop end portion 72.

As shown in FIGS. 7-10, it is now possible for the first loop end portion 71 to be mounted into the first partial space 111 of the receiving space 110 now provided by the additional sleeve 15. It is then possible for the loop 7 to be led around the tubular frame portion 90 and pulled back toward the hook 10, wherein the second loop end portion 72 are mounted into the second second partial space 112 which adjoins the first partial space 111 directly in the first direction $R_1$ and without interruption. It can be seen that the free portions 78 of all end portions 731, 732, 741, 742 point in the same direction, specifically are directed toward the securing portion 12 or the jump mat 6.

As illustrated in FIGS. 7-10, the ridge 151 engages into the space between the end portions 731, 742 and 732, 741, which are in contact, toward the clamping regions 75, wherein, in the tensioned state, said space is delimited in the proximal direction by the clamping elements 76, 77. This has the result that the cord loop 7 is fixed with its cord loop ends 71, 72 against the additional sleeve 15 so as to be secured against lateral slippage resulting from use.

By means of the insertion of the additional sleeve 15 as per the refinement of the securing system 100, it is additionally achieved, for the lateral fixing of the loop end portion 71, 72, that the loop end portions 71, 72 are spread apart by means of the U shape of the main body 152 of the additional sleeve 15, such that the four cord portions proceeding from the additional sleeve 15, which run between the cord hook 10 and the tubular frame 9, are spatially separated from one another to a relatively great extent. This has the advantage that, during the intended use of the trampoline 1, contact between these four cord portions is prevented, which further improves the wear resistance of the securing system 100 and furthermore minimizes the generation of disturbing noises.

The additional sleeve 15 thus has a dual function: firstly, it is the intention for the cord loop 7 to be fixed, and secondly, it is the intention for contact between cord loop end portions to be prevented, other than in the clamping regions 75, during intended use.

FIG. 11 shows, in a perspective view, an embodiment of the trampoline 1. The trampoline 1 comprises the closed trampoline frame 9, to which a multiplicity of legs is attached. The jump mat 6 is suspended in the frame 9, wherein the securing system 100 has been used. The securing system 100 is composed of a multiplicity of cord hooks 10 with loops 7 and with band elements 8 as described herein, wherein the respective loops 7 are led around corresponding frame portions 90.

FIGS. 12-15 show a second embodiment of the cord hook 10 according to the invention with the above-described second embodiment of the cord loop 7. The cord hook 10 is in this case no longer formed as a wire hook but rather is designed as a molded part. The cord hook 10 is preferably molded from plastic; use may however also be made of other materials such as for example metal or alloys. The hook 10 may be molded, cast, injection-molded or produced using some other technology.

The cord hook 10 has a drum-like main body 113 which is closed off at its free end by means of a plate-like covering 114 which projects beyond the main body 113. The covering 114 projects with its free end toward the securing portion 12 and thus ensures that the received loop end portions 71, 72 are mounted in the receiving space 110 so as to be secured against slipping relative to the first direction $R_1$. The drum-like receiving portion 113 provides the receiving space 110 and has substantially the form and function of the above-described main body 152 of the additional sleeve 15. Again, the transition portion 13 is integrally formed at that end of the drum-like receiving portion 113 which is situated opposite the covering 114. Said transition portion 13 is likewise of plate-like form and delimits the receiving space 110 counter to the first direction $R_1$. The securing portion 12 is integrally formed at the proximal end of the transition portion 13.

The securing portion 12 is formed by two hook elements 122, 123 directed toward one another. The two hook elements 122, 123 have receiving portions which both run in an aligned manner along the second direction $R_2$. The band element 8 is formed in 2 parts by two relatively narrow band elements 82, 83. The first partial band element 82 is mounted into the first hook element 122, and the second partial band element 83 is mounted into the second hook element 123. The abovementioned action point A is in this case now situated centrally between the two receiving portions of the first and second hook elements 122, 123. As can be seen from the figures, the transition portion 13 and securing portion 12 are shaped such that the action point A is raised to the level of the center of the main body 113. This may generally be advantageous.

In each case one relatively narrow partial band element 82, 83 is mounted into the two hook elements 122, 123. In the tensioned state, the two partial band elements 82, 83 exert a resultant force on the cord hook 10, which resultant force can again be represented by the main tension vector V which acts at the action point A.

FIGS. 16-19 illustrate a third embodiment of the cord hook 10 with the above-described second embodiment of the cord loop 7. By contrast to the second embodiment, the securing portion 12 is now shaped such that the first and second hook elements 122, 123, which run along the second direction $R_2$, open not toward one another but outwardly.

FIG. 20 shows a fourth embodiment of the cord hook 10 in three sub-FIGS. 20a)-c). FIGS. 21-24 then show the cord hook as per FIG. 20 with the above-described second embodiment of the cord loop 7 and with a two-part band element 8, as described above.

This fourth embodiment is likewise designed as a preferably single-piece molded part, wherein the form is based substantially on the additional sleeve 15 as described above. Instead of the plate element 154 shown at the bottom in FIG. 6, it is the case in the fourth embodiment of the cord hook 10 that the transition portion 13 is integrally formed, which transition portion extends in the proximal direction as far as the securing element 12. The securing portion 12 is shaped such that two hook elements 122, 123 are again formed, which open outwardly, similarly to the situation in the second embodiment of the cord hook 10.

The securing portion 12 is a bar element which runs substantially along the second direction $R_2$ and which has an elliptical or circular cross section, wherein, at lateral ends of the securing portion 12 along the second direction $R_2$, there are provided covering elements, that is to say securing projections, which covering elements are formed so as to extend the bar element in the distal direction toward the receiving space 110 and secure the received band element 8.

As can be seen in particular in FIG. 20, it is again the case that a vertical ridge 151 is provided, which ensures lateral fixing of the loop 7 by engagement into the clamping regions 75 as described above. It can furthermore be seen that wall-like abutment elements 14 which project in the first direction $R_1$ are provided at the lateral edges of the transition portion 13. Said abutment elements 14 are designed such that, between them, a receiving partial space 115 for receiving the free portions 78 at least of the first loop end portion 71 is formed. Said abutment elements 14 thus perform substantially a similar function to the vertical ridge 151; specifically, they lead to lateral fixing at least of the first loop end portion 71 in the tensioned state. By contrast to the vertical ridge 151, the abutment elements 14 however act not from the inside but from the outside on the free portions 78 of the loop 7, and fix these in the receiving partial space 115 so as to secure them against lateral slippage.

FIGS. 25-28 illustrate a fifth embodiment of the cord hook 10. The receiving portion 11 is again formed by a drum-like main body 113 and a plate-like covering 114 which covers the free end of said main body 113. The covering 114 again projects toward the securing portion 12. As can be seen from the figures, an orientation of the plate-like covering 114 does not run perpendicular to the first direction $R_1$, as in the above second to fourth embodiments, but is rather arranged obliquely with respect to the first direction $R_1$. The covering 114 is substantially directed toward the action point A. As can be seen in particular from FIG. 26, it is thus possible to realize an areal receptacle of the second loop end portion 72, the strands of which run apart from one another in the direction of the frame portion 90. In particular, it can also be seen from FIG. 26 that the transition portion 13 which adjoins the covering 114 extends, similarly to the covering 114, in the proximal direction in a manner directed toward the action point A.

It can also be seen from FIG. 28 that the transition portion 113 transitions into lateral abutment elements 14 which, in a proximal direction, continuously increase in height and, in the proximal region, are each equipped with an opening such that a bolt 124 finning in the second direction $R_2$ is supported in said openings, wherein said bolt provides the securing portion 12.

FIGS. 25, 27 and 28 show that the first loop end portion 71 engages with the free portions 78 between the arm-like abutment elements 14, which project in the proximal direction, into the receiving partial space 115 and is secured there against lateral slippage.

Figure 32:
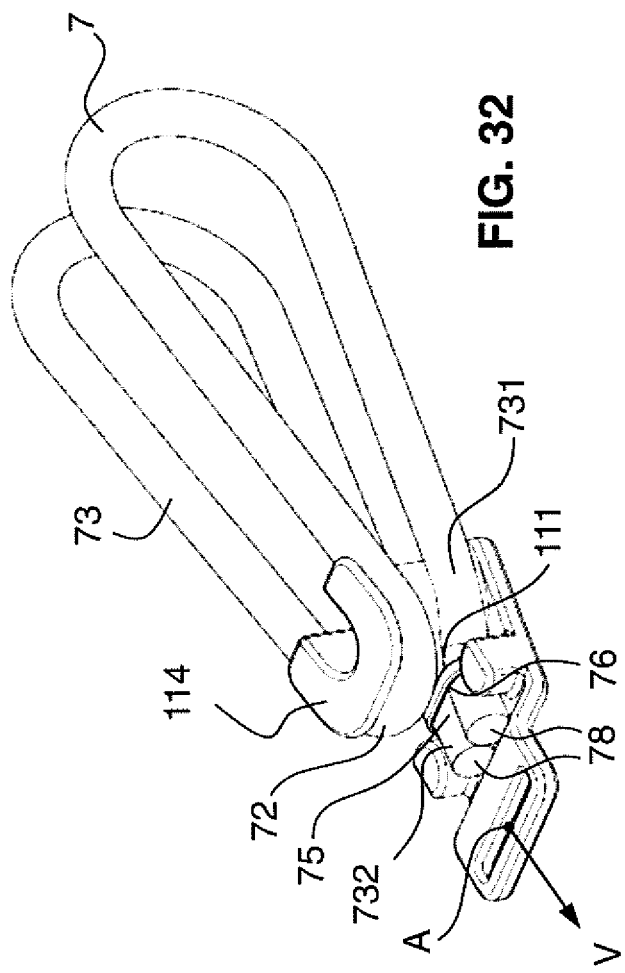
FIG. 32 shows a view of the seventh embodiment of the cord hook according to the invention as per FIG. 31 of a third embodiment of the cord loop.

FIGS. 29, 30 show a sixth embodiment of the cord hook 10 with the above-described second embodiment of the cord loop 7, and FIGS. 31, 32 illustrate a seventh embodiment of the cord hook 10 with the third embodiment of the cord loop 7.

FIG. 29 shows the again drum-like main body 113, which is of U-shaped cross section, of the cord hook 10, which main body extends with its longitudinal axis along the first direction $R_1$. At the end side in relation to the first direction $R_1$, the main body 113 is closed off by means of a plate-like covering 114 which projects toward the securing element 12. The plate-like covering covers the main body 113 to both sides and in the proximal direction, that is to say toward the securing portion 12. The covering 114 is again, as described in the context of the fifth embodiment, arranged so as to be inclined toward the action point A. As can be seen in FIGS. 30, 32, this permits areal contact between the second loop end portion 72 mounted in the receiving portion 11 and that surface of the covering 114 which is directed toward the cord hook 10.

The optimum inclination of the covering 114 is thus dependent on the diameter of the trampoline frame 9, on the length of the loop 7, and on the hook geometry.

At that end of the main body 113 which is situated opposite the plate-like covering 114, there is arranged the transition portion 13, which extends in a plate-like manner from the main body 113 in the proximal direction. As can be seen from the figures, the plate-like transition portion 13 likewise runs in an inclined manner in relation to the first direction as is the case for the plate-like covering 114. In the proximal region of the transition portion 13, there are arranged two abutment elements 14, which, spaced apart from the main body 113, project in the first direction $R_1$ from the transition portion 13. The abutment elements 14 are of monolithic design, and those sides of the abutment elements 14 which are directed toward one another are of rounded design. It is thus achieved that the loop 7 is not exposed to any sharp edges. Since the transition portion 13 projects laterally beyond the main body 113 and the abutment elements 14 are arranged in each case at the lateral edge of the transition portion 13, the receiving elements 14 again provide a receiving partial space 115 in which the free portions 78 of the loop 7 can be received, whereby lateral fixing is provided. The receiving partial space 115 adjoins the receiving space 110. As can be seen from FIGS. 29 and 30, the abutment elements 14 are each designed to be so tall in the first direction $R_1$ that there is space for all four free portions 78 in the receiving partial space 115. A height of the abutment elements 14 along the first direction $R_1$ is thus substantially equal to one and a half times to twice the diameter of the cord used for the loop 7.

A width of the receiving partial space 115 is generally preferably approximately twice as wide as the cord diameter.

The main body 113 again defines the receiving space 110, which is divided by the straight line g, which extends through the action point A of the securing portion 12 and perpendicular to the first direction $R_1$, into two partial spaces 111 and 112 for receiving the first and second loop end portions 71, 72.

FIG. 30 shows how a loop 7 of the second embodiment is mounted. Correspondingly, the first loop end portion 71 and the second loop end portion 72 are inserted into the receiving space 110, that is to say the first and second partial space 111, 112, and are held in the receiving space 110 by the plate-like covering 114 and by the transition portion 13. The free portions 78 extend from the receiving space 110 into the receiving partial space 115, and are secured there against lateral slippage by the lateral abutment against the abutment elements 14.

The securing portion 12, which is raised upward toward a center of the main body 113, extends in the proximal direction of the abutment elements 14. Said securing portion 12 is of plate-like form and has a proximally arranged slot 125, such that a shackle is formed into which a band element 8 (not illustrated) can be mounted. The action point A, from which the main tension vector V extends in the direction of the band element in the tensioned state, is again situated, centrally with respect to the second direction $R_2$, on that surface of the securing element 12 which defines the slot 125 counter to the proximal direction.

FIGS. 31 and 32 illustrate the seventh embodiment of the cord hook 10. This differs from the sixth embodiment merely by a projecting height of the abutment elements 14. As can be seen in the figures, the abutment elements 14 are designed to be only half as tall as the abutment elements 14 of the sixth embodiment. Correspondingly, the receiving partial space 115 is designed to be less tall, and is designed only to receive two free portions 78 situated adjacent to one another. The seventh embodiment of the cord hook 10 is suitable in particular for a third embodiment of the loop 7.

In the third embodiment of the loop 7, only a first cord portion 73 is used, which has the two end portions 731 and 732. The end portions 731, 732 are, pointing parallel and in the same direction, fixedly clamped to one another by means of a clamping element 76 so as to form the first loop end portion 71. Correspondingly, the third embodiment of the loop 7 has only one clamping region 75, which is received in the first partial space 111 of the receiving space 110, such that the free portions 78 thereof project from the receiving space into the receiving partial space 115 and, there, are secured against lateral slippage by the abutment elements 14. The second loop end portion 72 is formed by a loop portion situated opposite the clamping region 75 in the case of a spread-out loop 7.

The sixth and seventh embodiment of the cord hook 10 thus have pin-like abutment elements 14 which project from the transition portion 13 and which form a receiving partial space 115 and which serve for the lateral fixing of the clamping region 75 by acting from the outside with respect to the loop 7.

The securing portion is formed here as a shackle, and the plate-like covering 114 which delimits the main body 113 in the first direction $R_1$ and the transition portion 13 are of plate-like form and are arranged so as to run toward one another in the proximal direction.

The embodiments as per FIGS. 29-32 may likewise be equipped with a vertical ridge as described above. Furthermore, the securing portions 12 may be designed as in the embodiments as per FIGS. 15-26.

It is self-evident that the various securing portions and various hook portions of the various embodiments discussed here may be combined with one another as desired. It is also self-evident that an inclination of the plate-like covering 114 or of the transition portion 13 with respect to the first direction $R_1$ can be adapted by a diameter of the tube portion 90 of the trampling frame 9, and may be formed in all embodiments. Furthermore, the various embodiments of the loop may also be combined with the various embodiments of the cord hooks.

The cord hooks 10 may, in the tensioned state, be installed in the securing system 100 so as to be in an upwardly open or downwardly open orientation and so as to tension the jump mat 6. The cord hooks 10 are preferably downwardly open in the installed position, such that the risk of injury to the user when using the trampoline 1 is reduced.

FIGS. 33 to 35 show an eighth embodiment of the cord hook 10 in various views. This cord hook 10 again has a receiving portion 11, a securing portion 12 and a transition portion 13 which connects the receiving portion 11 and the securing portion 12. The proximally arranged receiving portion 11 has the form of a distally cut-open hollow cylinder with a circular cross section, which extends along the direction $R_1$. The hollow space and the distal recess assist in saving material, and in providing a design which has an approximately constant wall thickness, which is advantageous for the production of the cord hook 10.

The receiving portion 11 is, in FIG. 33, closed off in an upward direction by the covering 114. This covering 144 again assists in achieving that a mounted cord portion of the loop 7 does not slip out of the receiving space 110.

The transition portion 13 has, at the side situated opposite covering 114, a structure of ribs 131 (see FIG. 34). In this embodiment, three ribs 131 are provided, wherein the central rib is formed so as to be shorter than the outer ribs. This rib structure stabilizes the cord hook 10 and assists in saving material.

The transition portion 13 transitions, in the proximal direction, into two laterally attached arms 128, 129, which, as wall elements attached to the lateral edge of the transition portion 13 and of the securing portion 12, laterally delimit the transition portion 13 and the securing portion 12 and, in sections, in the distal region, project beyond the transition portion 13 and the securing portion 12 upward in FIG. 33. Thus, these arms 128, 129, in the distal region, again act as lateral abutment element 14 for securing free ends of the cord loop 7 in the tensioned state. Towards the distal end, the arms 128, 129 run freely, and are connected at the distal edge by a transversely running beam element 127. Thus, a slot 126 is formed by the securing portion 12, which slot runs along the longitudinal extent $L_{12}$ of the securing portion 12. In other words, it can also be stated that the securing portion 12 has, in the distal region, a slot 126 running along the longitudinal extent $L_{12}$ of the securing portion 12, wherein the slot is formed so as to be continuous in the direction $R_1$, that is to say extends from a top side to a bottom side of the securing portion 12. Said slot 126 can likewise be seen in the detail view in FIG. 37, in which the bolt element 124 arranged in the slot 126 can be seen. A width of the slot may amount to slightly more than twice the material thickness of the material for the band elements 8.

It is also the case in the eighth embodiment of the cord hook 10 that a bolt element 124 is provided for the securing of the band element 8, as is already the case in the embodiment as per FIGS. 25 and 26. Said bolt element 124 is fitted in the depth of the slot 126, specifically is offset toward the ribs 131 (that is to say downward in FIGS. 33 and 36). FIG. 36 shows a longitudinal section through the cord hook 10 and in particular also a cross section through said bolt element 124. The offsetting of the bolt element 124 into the region toward the ribs 131, that is to say downward in FIG. 36, makes it possible for the receptacle of the bolt element 124 to likewise be arranged in this region. To receive the bolt element 124, it is typically the case that recesses or holes are formed into the arms 128, 129. Such recesses correspondingly weaken the arms 128, 129. In order that this weakening of the arms 128, 129 leads to no or only minimal impairment of the tensioning performance of the cord hook 10, they are formed so as to be offset downward in FIG. 36. As a consequence of this, the mounted band element 8 is subjected to a diversion 84, as shown in FIG. 36. At the same time, the beam element 127 ensures that the band element 8 is introduced at the correct height approximately centrally in relation to the receiving space 110, which is advantageous for the position of the main tension vector V.

It can also be seen from FIG. 36 that the slot 126 widens toward the side of the ribs 131, and is of rounded form. The rounding substantially follows the rounding of the cylindrical bolt element 124, wherein the widening is positioned so as to surround the bolt element 124. The bolt element 124 in this case has a circular cross-sectional shape, wherein the diameter is selected such that the bend radius in the band element 8 does not cause excessive material loading in the material of the band element 8. It is also conceivable for the cross section of the bolt element 124 to have some other shape.

As shown in FIG. 36, the band element 8 is now inserted into the slot 126 from above, is looped around the bolt element 124, and is led outward again. The arms 128, 129 are advantageously provided such that they project laterally beyond the beam element 127 upward in FIG. 36, such that the band element 8 lying on the beam element 127 is additionally laterally guided. As can moreover be seen from FIG. 36, the beam element 127 is likewise of rounded form at its most distal ends, in order to follow the substantially elliptical longitudinal sectional shape of the cord hook 10.

It can also be seen from FIGS. 33 to 37 that the cord hook 10 is of rounded form in its outer shape, such that the longitudinal sectional shape of the cord hook 10 is substantially elliptical. This design assists in saving material and again minimizes the risk of injury. For this purpose, both the receiving portion 11 together with the covering 114 and also the transition portion 13 and/or the securing portion 12 are of correspondingly rounded design. This can be seen particularly clearly in FIG. 36, which illustrates the longitudinal section through the cord hook 10 of the eighth embodiment.

Moreover, it can be seen in particular from FIG. 35 that the cord hook 10 widens in the proximal direction, that is to say in the direction of the receiving portion 11 in the direction of the securing portion 12. This widening is also implemented in the case of the covering 114. The widening amounts to approximately 10-20% of a width measured on the height of the cylinder axis of the hollow cylindrical main body 113. This widening makes allowance for the fact that, firstly, a diameter of the main body 113 may be designed such that the loop 7 lies optimally in the receiving space 110 without being subjected to excessively intense bending and without the provision of excessively large dimensions of the cord hook 10, and secondly, the dimension of the securing portion 12 in its longitudinal extent $L_{12}$ is so long that a band element 8 with an optimum width of for example 10 millimeters to 20 millimeters, in particular approximately 15 millimeters, can be inserted. It is self-evidently also conceivable for the form of the cord hook 10 in this regard to be different, depending on what material is selected for the band element 8 or what width the band element 8 is ultimately intended to have, and what type of loops 7 are used, or what diameter the receiving portion 11 is intended to have.

The provision of a bolt element 124 in the securing portion 12 for receiving the band element 8 has the advantage, irrespective of the specific embodiment, that the band elements 8 can already be fixedly sewn, or secured in some other way, to the jump mat 6 during the production process, before the corresponding cord hook 10 has to be mounted into the corresponding band element 8. In this way, it is for example the case that the intermediate product of jump mat 6 with secured band elements 8 can be stored in a more effective manner. Furthermore, a possible removal of the bolt element 124 also permits a retroactive exchange of the individual cord hook 10 in the event of a defect.

The advantage of the exchangeability self-evidently also arises from securing portions 12 which permit a mounting of the band elements 8, that is to say which have for example inwardly and/or outwardly open hook elements 122, 123 for the mounting of the corresponding band element 8.

Furthermore, the cord hooks 10 of all embodiments, aside from those in FIGS. 25 to 37, have open hook elements 122, 123. The provision of the open hook elements 122, 123 makes it possible for the band element 8 to already be fixedly connected, for example sewn, to the jump mat 6, and for the cord hook 10 to then be simply mounted with the securing portion 12 of the band element 8 during the final assembly of the trampoline 1.

It is self-evident that the differently designed securing portions 12, transition portions 13 and receiving portions 11 may be combined with one another.

LIST OF REFERENCE DESIGNATIONS

| | |
|---|---|
| 1 | Trampoline |
| 10 | Cord hook |
| 100 | Securing system |
| 11 | Receiving portion |
| 110 | Receiving space |
| 111 | First partial space of 110 |
| 112 | Second partial space of 110 |
| 113 | Main body, drum section |
| 114 | Covering |
| 115 | Receiving partial space |
| 12 | Securing portion |
| 121 | Free end of 12 |
| 122 | First hook element |
| 123 | Second hook element |
| 124 | Pin element |
| 125 | Recess |
| 126 | Slot |
| 127 | Beam element |
| 128, 129 | Arm |
| 13 | Transition portion |
| 131 | Rib |
| 14 | Abutment element |
| 15 | Additional sleeve |
| 151 | Vertical ridge |
| 152 | Main body |
| 153 | End plate |
| 154 | End plate |
| 6 | Jump mat |
| 7 | Loop |
| 71 | First loop end portion of 7 |
| 72 | Second loop end portion of 7 |
| 73 | First cord portion 7 |
| 731 | First end portion of 73 |
| 732 | Second end portion of 73 |
| 74 | Second cord portion of 7 |
| 741 | First end portion of 74 |
| 742 | Second end portion of 74 |
| 75 | Clamping region |
| 76 | First clamping element |
| 77 | Second clamping element |
| 78 | Free portion of 7 |
| 791 | First loop |
| 792 | Second loop |
| 8 | Flexible band element |
| 81 | Distal end portion of 8 |
| 82 | First part of a two-part band element |
| 83 | Second part of a two-part band element |
| 84 | Diversion of 8 |
| 9 | Trampoline frame |
| 90 | Portion of 9 |
| A | Action point |
| g | Straight line |
| $L_{11}$ | Longitudinal extent of 11 |
| $L_{12}$ | Longitudinal extent of 12 |
| $R_1$ | First direction |
| $R_2$ | Second direction |
| $R_V$ | Direction of V |
| V | Main tension vector |

The invention claimed is:

1. A cord hook for securing a jump mat to a trampoline frame by means of a cord loop and at least one flexible band element having a distal end portion, the cord hook comprising:

a distal receiving portion, wherein the receiving portion extends along a first direction and defines a receiving space for receiving a first loop end portion and a second loop end portion of the cord loop;

a proximal securing portion, which extends along a second direction and which is designed such that the distal end portion of the flexible band element can be secured thereto;

a transition portion which connects the receiving portion and the securing portion and which delimits the receiving space on one side;

wherein, when the cord hook is put under tension by means of the cord loop securing the jump mat, a main tension vector is defined by tension on a proximal end portion of the at least one flexible band element;

wherein the cord hook is designed such that a straight line through the main tension vector of the cord hook under tension and the flexible band element divides the receiving space into a first partial space and a second partial space such that, during intended use of the cord hook, the first loop end portion lies in the first partial space and the second loop end portion lies in the second partial space;

wherein the cord hook is formed as a single-piece plastic part which has a vertical ridge which projects centrally into the receiving space and which serves for centering a clamping region of a cord loop in the receiving space.

2. The cord hook as claimed in claim 1, wherein the first direction and the second direction run transversely with respect to one another.

3. The cord hook as claimed in claim 1, which is furthermore designed such that the straight line through the main tension vector intersects the receiving portion centrally with respect to a longitudinal extent along the first direction.

4. The cord hook as claimed in claim 1, which is furthermore designed such that the straight line through the main tension vector intersects the securing portion centrally with respect to a longitudinal extent along the second direction.

5. A cord hook for securing a jump mat to a trampoline frame by means of a cord loop and at least one flexible band element having a distal end portion, the cord hook comprising:

a distal receiving portion, wherein the receiving portion extends along a first direction and defines a receiving space for receiving a first loop end portion and a second loop end portion of the cord loop;

a proximal securing portion, which extends along a second direction and which is designed such that the distal end portion of the flexible band element can be secured thereto;

a transition portion which connects the receiving portion and the securing portion and which delimits the receiving space on one side;

wherein, when the cord hook is put under tension by means of the cord loop securing the jump mat, a main tension vector is defined by tension on a proximal end portion of the at least one flexible band element;

wherein the cord hook is designed such that a straight line through the main tension vector of the cord hook under tension and the flexible band element divides the receiving space into a first partial space and a second partial space such that, during intended use of the cord hook, the first loop end portion lies in the first partial space and the second loop end portion lies in the second partial space;

wherein the cord hook is formed as a single-piece plastic part; and at least one abutment element is provided which narrows the receiving space and which is arranged on the transition portion such that the abutment element is spaced apart from the receiving portion in the direction of the main tension vector and, at least in sections, extends parallel to the receiving portion along the first direction away from the transition portion and laterally proximally delimits the first partial space and the second partial space of the receiving space and is suitable for centering a clamping region of a cord loop in the receiving space.

6. The cord hook as claimed in claim 5, wherein the first direction and the second direction run transversely with respect to one another.

7. The cord hook as claimed in claim 5, which is furthermore designed such that the straight line through the main tension vector intersects the receiving portion centrally with respect to a longitudinal extent along the first direction.

8. The cord hook as claimed in claim 5, which is furthermore designed such that the straight line through the main tension vector intersects the securing portion centrally with respect to a longitudinal extent along the second direction.

9. A trampoline having a jump mat and having a trampoline frame, wherein the trampoline furthermore comprises a multiplicity of cord hooks, a multiplicity of elastic cord loops, wherein the number of cord hooks is equal to the number of elastic cord loops, and one flexible band element for each cord hook, wherein the multiplicity of cord hooks, the multiplicity of elastic cord loop and the flexible band elements are used to mount the jump mat in the trampoline frame, wherein the cord hook comprises:
  a distal receiving portion, wherein the receiving portion extends along a first direction and defines a receiving space for receiving a first loop end portion and a second loop end portion of the cord loop;
  a proximal securing portion, which extends along a second direction and which is designed such that the distal end portion of the flexible band element can be secured thereto;
  a transition portion which connects the receiving portion and the securing portion and which delimits the receiving space on one side;
  wherein, when the cord hook is put under tension by means of the cord loop securing the jump mat, a main tension vector is defined by tension on a proximal end portion of the at least one flexible band element;
  wherein the cord hook is designed such that a straight line through the main tension vector of the cord hook under tension and the flexible band element divides the receiving space into a first partial space and a second partial space such that, during intended use of the cord hook, the first loop end portion lies in the first partial space and the second loop end portion lies in the second partial space;
  wherein the cord loops are formed from a first cord portion, or from a first cord portion and a second cord portion, wherein each cord portion has in each case one first end portion and one second end portion, wherein the first end portion of the first cord portion is clamped to the second end portion of the first or of the second cord portion in a clamping region, and the second end portion of the first cord portion is clamped to the first end portion of the first or of the second cord portion respectively in a clamping region, such that the free portions of those end portions which are clamped together in each case point in the same direction, wherein the clamping region are mountable into the first or second partial space of the corresponding cord hook.

10. The trampoline according to claim 9, wherein the cord loops are formed from a first cord portion, wherein each cord portion has in each case one first end portion and one second end portion, and wherein the first and second end portions are in each case bent to form a first loop and a second loop and are fixedly clamped in each case by means of at least one clamping element, wherein the first and second loops are mountable into the first and second partial space of the corresponding cord hook.

11. The trampoline as claimed in claim 9, wherein the cord loops are in each case tensioned such that the clamping region is situated in each case in the first or in the second partial space corresponding cord hook.

12. The trampoline as claimed in claim 10, wherein the first and second loop are mounted into the first and second partial space of the corresponding cord hook.

13. A method for securing a jump mat to a trampoline frame,
  i) providing a multiplicity of cord hooks,
  ii) providing a multiplicity of elastic cord loops,
  iii) providing a multiplicity of flexible bands,
  wherein the number of cord hooks is equal to the number of elastic cord loops, and one flexible band element is provided for each cord hook, wherein the multiplicity of cord hooks, the multiplicity of elastic cord loop and the flexible band elements are used to mount the jump mat in the trampoline frame, wherein the cord hook comprises:
  a distal receiving portion, wherein the receiving portion extends along a first direction and defines a receiving space for receiving a first loop end portion and a second loop end portion of the cord loop;
  a proximal securing portion, which extends along a second direction and which is designed such that the distal end portion of the flexible band element can be secured thereto;
  a transition portion which connects the receiving portion and the securing portion and which delimits the receiving space on one side;
  wherein, when the cord hook is put under tension by means of the cord loop securing the jump mat, a main tension vector is defined by tension on a proximal end portion of the at least one flexible band element;
  wherein the cord hook is designed such that a straight line through the main tension vector of the cord hook under tension and the flexible band element divides the receiving space into a first partial space and a second partial space such that, during intended use of the cord hook, the first loop end portion lies in the first partial space and the second loop end portion lies in the second partial space,
  wherein the method further comprises
  iv) looping the cord loop around a portion of the trampoline frame and mounting the first loop end portion and the second loop end portion into the receiving space of the cord hook in order to tension the jump mat in the trampoline frame;
  wherein the cord loop is formed from a first cord portion or from a first cord portion and a second cord portion, wherein each cord portion has in each case one first end portion and one second end portion, wherein the first end portion of the first cord portion is clamped to the second end portion of the first or of the second cord portion in a clamping region, and the second end portion of the first cord portion is clamped to the first end portion of the first or of the second cord portion respectively in a clamping region, such that the free portions of those end portions which are clamped together in each case point in the same direction, wherein the clamping region is mounted into the first or second partial space of the corresponding cord hook.

14. A method for securing a lump mat to a trampoline frame,
   i) providing a multiplicity of cord hooks,
   ii) providing a multiplicity of elastic cord loops,
   iii) providing a multiplicity of flexible bands,
   wherein the number of cord hooks is equal to the number of elastic cord loops, and one flexible band element is provided for each cord hook, wherein the multiplicity of cord hooks, the multiplicity of elastic cord loop and the flexible band elements are used to mount the jump mat in the trampoline frame, wherein the cord hook comprises:
   a distal receiving portion, wherein the receiving portion extends along a first direction and defines a receiving space for receiving a first loop end portion and a second loop end portion of the cord loop;
   a proximal securing portion, which extends along a second direction and which is designed such that the distal end portion of the flexible band element can be secured thereto;
   a transition portion which connects the receiving portion and the securing portion and which delimits the receiving space on one side;
   wherein, when the cord hook is put under tension by means of the cord loop securing the jump mat, a main tension vector is defined by tension on a proximal end portion of the at least one flexible band element;
   wherein the cord hook is designed such that a straight line through the main tension vector of the cord hook under tension and the flexible band element divides the receiving space into a first partial space and a second partial space such that, during intended use of the cord hook, the first loop end portion lies in the first partial space and the second loop end portion lies in the second partial space,
   wherein the method further comprises
   iv) looping the cord loop around a portion of the trampoline frame and mounting the first loop end portion and the second loop end portion into the receiving space of the cord hook in order to tension the jump mat in the trampoline frame;
   wherein each cord portion has in each case one first end portion and one second end portion, and wherein the first and second end portions are in each case bent to form a first and a second loop and are fixedly clamped in each case by means of at least one clamping element, wherein the first and second loops are mounted into the first and second partial space of the corresponding cord hook.

* * * * *